(12) United States Patent
Kraus et al.

(10) Patent No.: US 11,248,963 B2
(45) Date of Patent: Feb. 15, 2022

(54) EQUIPMENT AND METHOD FOR THREE-DIMENSIONAL RADIANCE AND GAS SPECIES FIELD ESTIMATION IN AN OPEN COMBUSTION ENVIRONMENT

(71) Applicant: Honeywell International Inc., Morris Plains, NJ (US)

(72) Inventors: Kurt Kraus, Tulsa, OK (US); Matthew Martin, Tulsa, OK (US); Kwong Wing Au, Bloomington, MN (US); Sharath Venkatesha, Minnetonka, MN (US)

(73) Assignee: Honeywell International, Inc., Charlotte, NC (US)

( * ) Notice: Subject to any disclaimer, the term of this patent is extended or adjusted under 35 U.S.C. 154(b) by 718 days.

(21) Appl. No.: 15/873,172

(22) Filed: Jan. 17, 2018

(65) Prior Publication Data
US 2018/0209853 A1 Jul. 26, 2018

Related U.S. Application Data

(60) Provisional application No. 62/449,442, filed on Jan. 23, 2017.

(51) Int. Cl.
*G01J 5/00* (2006.01)
*G01N 21/3504* (2014.01)
(Continued)

(52) U.S. Cl.
CPC .............. *G01J 5/0014* (2013.01); *G01J 5/025* (2013.01); *G01J 5/602* (2013.01);
(Continued)

(58) Field of Classification Search
CPC .......... G01J 5/0014; G01J 5/025; G01J 5/602; G01N 21/72; G01N 21/3504; G01N 21/85
See application file for complete search history.

(56) References Cited

U.S. PATENT DOCUMENTS

| 7,528,372 B2 | 5/2009 | Garvey et al. |
| 7,876,229 B2 | 1/2011 | Rao et al. |
| (Continued) | | |

FOREIGN PATENT DOCUMENTS

| CN | 1628244 A | 6/2005 |
| CN | 101625269 B | 1/2010 |
| (Continued) | | |

OTHER PUBLICATIONS

Zhou et.al., Automatic alignment of infrared video frames for equipment leak detection , Analytica Chimica Acta, vol. 584, Issue 1, Feb. 12, 2007, pp. 223-227.

(Continued)

*Primary Examiner* — Regis J Betsch
*Assistant Examiner* — Jeremy A Delozier

(57) ABSTRACT

Process for measuring emission for a flame in an open combustion environment. A captured image is received from each of a plurality of image capturing devices in at least one selected spectral band. Each of the plurality of image capturing devices is trained on the flame from the combustion process from a different perspective view angle. A spectral path length of the flame in the at least one spectral band is estimated from the captured images. Emitted radiance of the flame is estimated from the captured images, and a temperature of the flame is estimated from the estimated emitted radiance. A gas species concentration of the flame is estimated from the temperature of the flame and the spectral path length of the flame. Emission for the flame is measured from the gas species concentration.

14 Claims, 16 Drawing Sheets

(51) Int. Cl.
*G01N 21/85* (2006.01)
*G01N 21/72* (2006.01)
*G01J 5/02* (2006.01)
*G01J 5/60* (2006.01)
*G01N 9/24* (2006.01)

(52) U.S. Cl.
CPC ......... *G01N 21/3504* (2013.01); *G01N 21/72* (2013.01); *G01N 21/85* (2013.01); *G01J 2005/0077* (2013.01); *G01N 9/24* (2013.01); *G01N 2021/8578* (2013.01)

(56) References Cited

U.S. PATENT DOCUMENTS

| | | |
|---|---|---|
| 8,009,932 B2 | 8/2011 | Zhou et al. |
| 8,138,927 B2 | 3/2012 | Diepenbroek et al. |
| 8,428,391 B2 | 4/2013 | Park |
| 8,447,068 B2 | 5/2013 | Matthes et al. |
| 9,127,891 B2 | 9/2015 | Au et al. |
| 9,196,032 B1 | 11/2015 | Kraus et al. |
| 9,212,851 B2 | 12/2015 | Martin et al. |
| 9,258,495 B2 | 2/2016 | Zeng et al. |
| 9,471,969 B2 | 10/2016 | Zeng et al. |
| 9,696,210 B2 | 7/2017 | Venkatesha et al. |
| 2005/0225759 A1 | 10/2005 | Edwin et al. |
| 2011/0085030 A1* | 4/2011 | Poe ............... F23N 5/08 348/61 |
| 2013/0342680 A1* | 12/2013 | Zeng ............... H04N 5/332 348/135 |
| 2014/0267671 A1 | 9/2014 | Kenny et al. |
| 2014/0347511 A1* | 11/2014 | Rodriguez-Serrano ............... H04N 5/23222 348/222.1 |
| 2015/0356720 A1* | 12/2015 | Kraus ............... G06T 7/0004 382/141 |
| 2015/0362372 A1* | 12/2015 | Venkatesha ........... G01J 5/0044 250/208.1 |
| 2016/0116164 A1 | 4/2016 | Ducharme et al. |

FOREIGN PATENT DOCUMENTS

| | | |
|---|---|---|
| CN | 101625270 A | 1/2010 |
| CN | 104299268 A | 1/2015 |
| CN | 104574509 A | 4/2015 |
| CN | 102881041 B | 5/2015 |
| CN | 105571741 A | 5/2016 |
| CN | 105608738 A | 5/2016 |
| CN | 104181162 B | 8/2016 |
| WO | 03085388 A1 | 10/2003 |
| WO | 2015057740 A1 | 4/2015 |

OTHER PUBLICATIONS

Li et.al., Shape from regularities for interactive 3D reconstruction of piecewise planar objects from single images, Proceedings of the 14th Annual ACM International Conference on Multimedia, MM 2006, pp. 85-88.

PCT Search Report dated Jun. 21, 2018 for corresponding PCT Application No. PCT/US2018/014775.

* cited by examiner

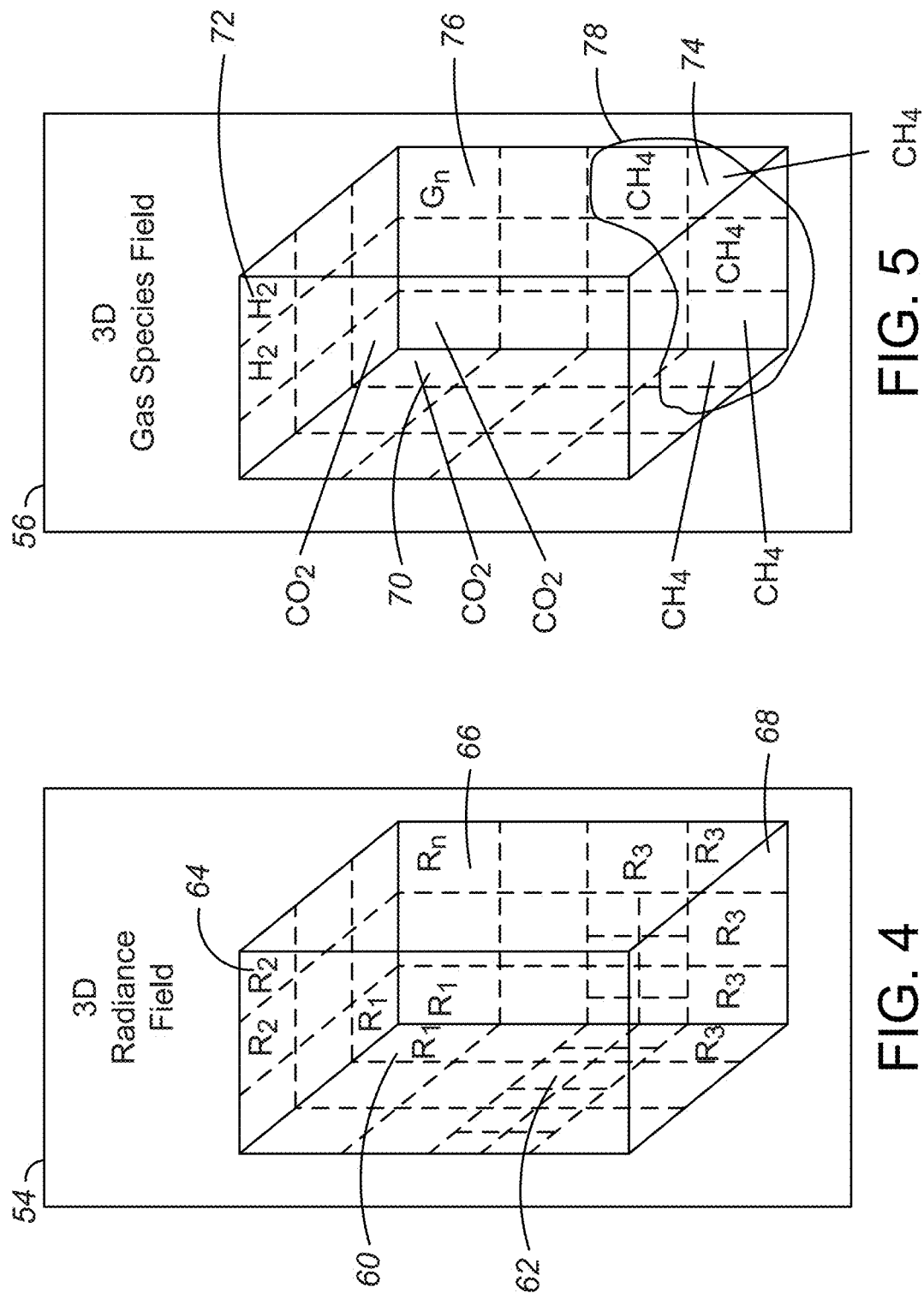

EQUIPMENT AND METHOD FOR THREE-DIMENSIONAL RADIANCE AND GAS SPECIES FIELD ESTIMATION IN AN OPEN COMBUSTION ENVIRONMENT

CROSS-REFERENCE TO RELATED APPLICATION

This application claims priority from Provisional Application No. 62/449,442 filed Jan. 23, 2017, the contents of which cited application are hereby incorporated by reference in its entirety.

BACKGROUND OF THE INVENTION

The present invention relates generally to a process for estimating conditions of a combustion process, and more particularly to a process for accurate estimation of a three-dimensional thermal radiance field and gas species field in an open combustion environment.

Accurately analyzing conditions of a combustion environment is a useful task for producing products more efficiently and saving energy-related costs. For example, for analyzing conditions of combustion, image-capturing devices, such as color cameras, infrared spectrometers, filtered cameras, and the like, may be installed for detecting temperatures. Intensities of image pixels received from the devices have a direct relationship with temperatures of viewed surfaces. Similarly, multi-spectral cameras have been used to detect the temperature of a flame and gas species.

Video-based technology may also be used to provide color or intensity images to an operator allowing the operator to manually interpret the state of a combustion process based on the images. Another example technology performs off-line intensity-temperature calibration and maps each color image to a specific temperature image, thereby providing a two-dimensional (2D) projection of a temperature and/or radiance field. Other technologies, such as laser and acoustic, offer three-dimensional (3D) temperature and/or radiance field estimation at specific locations, such as inside a furnace enclosure.

Another technology for video-based, three-dimensional temperature and/or radiance field estimation applies thermal radiation transfer equations to the temperature images. However, this method is inefficient and inaccurate, and does not provide a required resolution and accuracy due to complex, iterative computations required to resolve unknown temperature and radiance fields in a particular combustion environment. Another reason for the inaccuracy is attributed to poor-quality images caused by incorrect or limited controls of the image-capturing devices. As discussed above, relative positions of the image-capturing devices and imaging areas, such as enclosure walls, often shift their alignments and thus cause significant errors.

Recently, methods and systems have been developed for estimating radiance fields of a combustion process in an enclosure such as a furnace enclosure. Such methods and systems are disclosed in commonly-owned U.S. Pat. No. 9,196,032, issued Nov. 24, 2015, which is incorporated in its entirety by reference herein. Example methods disclosed in the '032 Patent estimate a three-dimensional radiance field by performing an intensity-temperature calibration based on an association between an intensity of an image pixel and an actual temperature associated with a selected region in the enclosure.

Some analyzing methods use multi-spectral imaging technology for the detection of the gas composition in an open combustion environment; that is, a combustion environment that is not fully contained within an enclosure. For example, it is known that emission of unburnt flue gases from a flare stack harms the environment. EPA regulations require 98% or more Destruction Removal Efficiency (DRE). Thus, it is useful to quantify gas species to aid in measuring and controlling such emissions.

Conventional methods for detecting gas composition in an open combustion environment can detect the presence or absence of certain gases along a viewing path, but these cannot provide the distribution of gas species in a three dimensional field. For example, it is known to measure combustion at a single point in time, but not continuous monitoring. In some conventional methods, measurement is taken from a point source (e.g., a sample at one point of the flare), along a line of sight (e.g., using laser or FTIR) or in a plane (e.g., using an imaging device). However, an open flame is both dynamic and voluminous. Current state of the art methods do not provide a global measurement/status of a flame.

Further, while some conventional methods have been used to attempt to measure combustion efficiency, such methods have proved unsuccessful in measuring destruction removal efficiency.

There remains a need for an improved method of estimating and detecting temperature and radiance fields within an open combustion environment.

SUMMARY

Processes and systems are provided herein for estimating and detecting three-dimensional temperature, radiance and gas species fields of an open combustion environment based on a set of multi-spectral images captured by a plurality of image-capturing devices.

Example methods and systems can provide three-dimensional real-time visualization, as well as simulation and understanding, of a combustion process in an open combustion environment, such as from a flare or field of flares. Example processes estimate emissions, including chemical species and concentrations within a virtual bounding volume or volumes surrounding a flame or flames, e.g., from flares. Chemical species may include gas and/or smoke concentrations. Emissions measures, such as Combustion Efficiency and Destruction Removal Efficiency (DRE), or others can also be provided.

Species information can be used to selectively control a combustion process by modulation or manipulation of input fuel sources, combustion air sources, or mechanical features of an associated flare within a virtual bounding volume based on indications from three-dimensional observations. For example, a fuel/air ratio of a combustion system may be adjusted. Portions of a combustion environment can be determined that contain the largest amounts of specific pollutants or other combustion process intermediate reactants. A burner operation or design may be modulated or modified to optimize a specific desired response based on the determination. The desired responses may include basic flame detection, reduction or minimization of pollutants, optimization of a fuel/air ratio for maximum fuel efficiency or other process needs.

In practice, example processes and systems may be applied to any combustion environment, including but not limited to open combustion environments, whose flames are generated by, for example, premix, diffusion mix, solid fuel, liquid fuel, and gaseous fuel used in industrial, residential, commercial, or power burners, flares, or thermal oxidizers. It is also contemplated that example processes and systems may be used to validate and/or optimize indications resulting from computational models of physical systems. Specifically, in certain embodiments, the present process observes a physical open combustion environment surrounded by a virtual bounding volume, and corresponding computational model input parameters are adjusted to conform to the physical observations.

An example process utilizes an array of optical spectral detectors, such as but not limited to multi-spectral image-capturing devices or cameras, disposed in an array alignment surrounding the combustion environment (e.g., surrounding the flare or field of flares) to define the virtual bounding volume. The virtual bounding volume includes virtual surfaces having pixels or points. By surrounding the virtual bounding volume, tomographic reconstruction, triangulation, or other processing techniques can be used to establish three-dimensional concentrations and spatial physical locations of various combustion intermediate or final products within the virtual bounding volume. An example virtual bounding volume is a virtual bounding volume of any shape that surrounds the flame of flames, though it is also contemplated that only a portion of a flame may be surrounded by the virtual bounding volume. The intermediate or final products include chemical radicals and molecules, such as OH, NO, NOx, CO, $CO_2$, N, Na, $O_2$, O, H, $H_2$, $H_2O$, C, S, SO, $SO_2$, and $SO_3$.

An advantage of the detectors arranged in the array alignment is that high resolution of the resulting image and data may be derived based on the images obtained from the detectors. Further, since multiple detectors are arranged in a spaced pattern array configuration, failures of one or more detectors due to breakage, fouling, blocked field of view or other similar defects, may only affect a part of the array, and the remaining, functional detectors can continue to provide images and associated data.

Each detector preferably detects an intensity of various light emissions from atomic or molecular species from the virtual bounding volume within the combustion environment across a predetermined span of a light spectrum. Each atomic particle is known to emit at a specific frequency. Since the particle's light emission frequency is unique and identifiable from those of other resident or potentially resident particles, an individual constituent can be automatically identified by a processing unit, e.g., a computer processor. Based on the intensity of the frequency of detected radiance, an associated degree of concentration or relative location can be inferred using the computer processor.

By computationally employing tomographic reconstruction, triangulation, or other suitable processing techniques to combine the data from an array of detectors, three-dimensional geometric and spatial properties of various species or atomic particles/molecules can be determined. Another advantage of certain embodiments of the present process is that the determination of the location and concentration of various chemical constituents within the virtual bounding volume is performed in real-time and on-line to modulate input streams or mechanical aspects of the combustion environment/flame for optimization of desired properties of the radiance and gas species fields in the combustion environment.

The foregoing and other aspects and features of the present invention will become apparent to those of reasonable skill in the art from the following detailed description, as considered in conjunction with the accompanying drawings.

BRIEF DESCRIPTION OF THE DRAWINGS

FIG. 4 illustrates an exemplary output of the 3D thermal radiance field estimation from the system shown in FIG. 2;

FIG. 5 illustrates an exemplary output of the 3D gas species field estimation from the system shown in FIG. 2;

DETAILED DESCRIPTION

Figure 1:
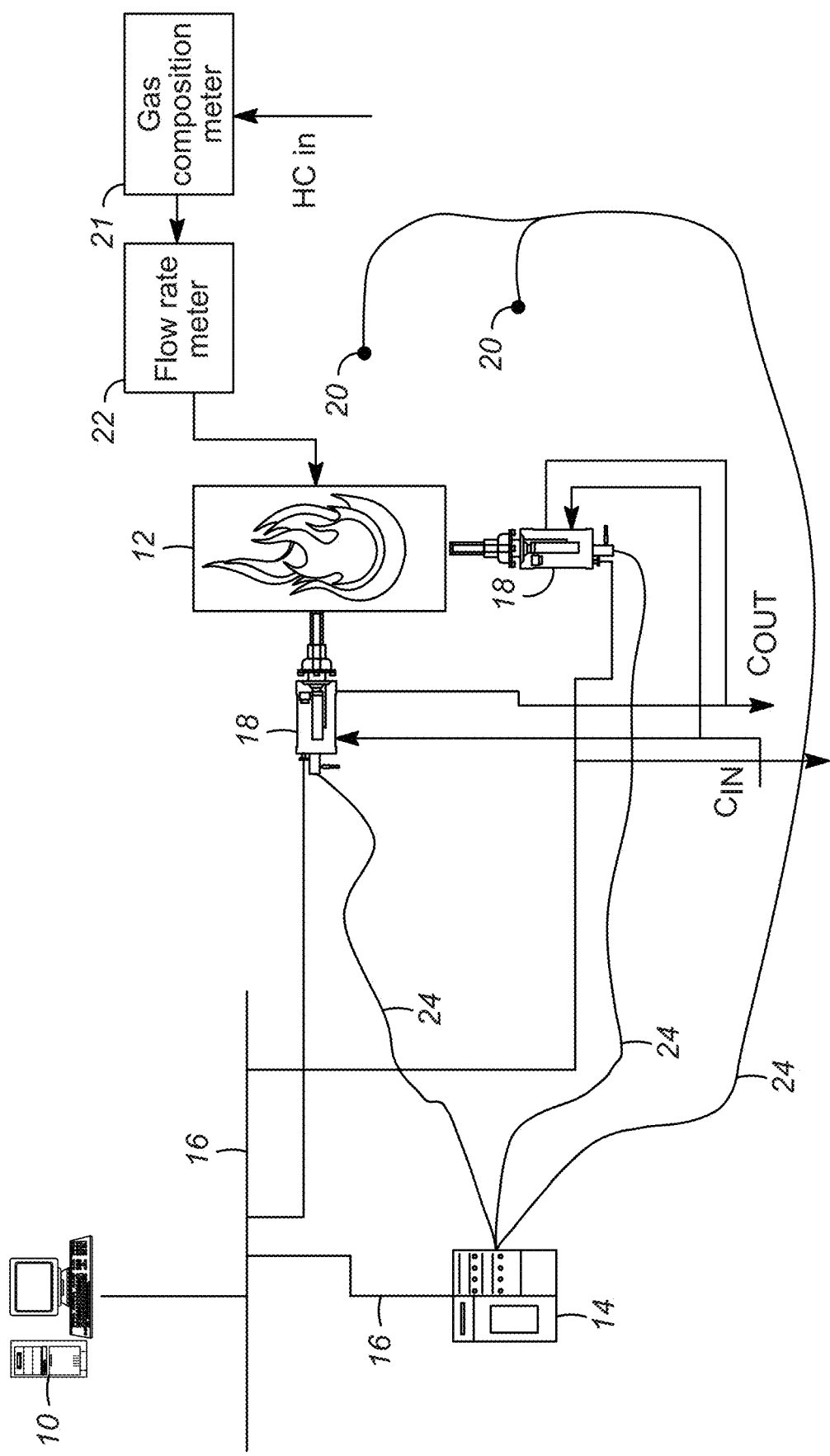
FIG. 1 illustrates an exemplary use of an example process in a camera system configuration surrounding an open combustion environment.

Referring now to FIG. 1, an exemplary estimation unit 10 using an embodiment of an example process is provided for accurately estimating a three-dimensional temperature and thermal radiance field of a combustion process in an open combustion environment, such as an open environment surrounding an open flare 12. Though an open combustion environment is shown, example methods can be used for other combustion environments as well. As used herein, an "open combustion environment" refers to an environment in which a combustion process occurs that is not surrounded by an enclosure. Instead of a single flare 12 as shown, a plurality of flares (e.g., a field of flares) may be provided in the open combustion environment.

As used herein, the term "unit" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present process should not be so limited since other modifications will become apparent to the skilled practitioner.

The estimation unit 10 can be coupled to a computing device 14, which may include a server, computing device, display monitor, output device, database, etc. It is also contemplated that the estimation unit 10 and the computing device 14 may be part of the same unit. The estimation unit 10 is programmed to perform tasks and display relevant data for different functional units via a communication channel such as a network 16. It is contemplated that other suitable networks or communication channels can be used, such as a corporate Intranet, a local area network (LAN) or a wide area network (WAN), and the like, using dial-in connections, cable modems, high-speed ISDN lines, and other types of communication methods, both wired and wireless, known in the art. Relevant information can be stored in the database for retrieval by the estimation unit 10 or the computing device 14 (e.g., as a data storage device and/or a machine readable data storage medium carrying computer programs).

A plurality of image capturing devices, embodied in multi-spectral image-capturing devices 18, are positioned around the flare 12. "Image capturing device" refers to a device that is configured to capture an image in one or more selected spectral bands; i.e., an image capturing device. Spectral bands can include both visible (i.e., visible to a person) and non-visible spectral bands. "Multi-spectral image capturing device" refers to any image-capturing device or plurality of image-capturing devices that individually or collectively can capture images in a plurality of selected spectral bands. "Positioned" can refer to either a fixed position or a momentary position for which a location of the image-capturing devices can be determined for the time when an image is acquired by the image-capturing devices. In the example shown in FIG. 1, two multi-spectral image-capturing devices 18 are shown, but additional devices being included, if desired. Non-limiting example devices and arrangements for the multi-spectral image-capturing devices 18 are disclosed herein. Example multi-spectral image-capturing devices 18 have the ability to capture the response in one or multiple parts of the electromagnetic spectrum including visible, ultra-violet, near infra-red (NIR), mid wave infrared (MWIR) and long wave infrared (LWIR). The multi-spectral image-capturing devices 18 can be configured to capture data in specific spectrum bands as required by detection of targeted gas species (e.g., detect presence of carbon monoxide). Example multi-spectral image-capturing devices 18 can also be auto-configured to detect a specific range of temperatures or radiance field. Further, each of the multi-spectral image capturing devices 18 preferably can be individually configured for one or more specific spectrum bands to increase the efficiency of the overall system and to enable detection of multiple gas species in one or different regions of the open combustion environment. Example multi-spectral image capturing devices 18 include, but are not limited to, charge-coupled device (CCD) cameras, ultraviolet (UV) cameras, near-wave infrared (NWIR) cameras, mid-wave infrared (MWIR) cameras, long-wave infrared (LWIR) cameras, or any combination of these. The multi-spectral image capturing devices 18 can include filters for imaging at selected spectral bands.

The multi-spectral image-capturing devices 18 can be fixedly positioned, e.g., by being incorporated into stationary devices fixed (e.g., mounted) at particular locations, or can be movably (transiently) positioned, e.g., by disposing the multi-spectral image-capturing devices in movable configurations. Examples of movable devices include pan-tilt platforms, vehicles, movable mounts, movable platforms, drones, etc. In an example system, each multi-spectral image-capturing device 18 can be liquid-cooled by directing the inflow of cold coolant $C_{IN}$ to the device, and delivering the outflow of warm coolant $C_{OUT}$ from device to an outlet.

Each of the multi-spectral image-capturing devices 18 captures image sequences covering a selected region of the open combustion environment, for which a temperature-radiance field and gas species field are to be estimated. In example processes and systems, the selected region is defined by a virtual bounding volume that surrounds the region of interest, such as a virtual bounding volume surrounding the flame from the flare 12, as disclosed in more detail below. A "virtual bounding volume" as used herein refers to a volume of any three-dimensional configuration that surrounds a region of interest but that is not defined by physical boundaries (such as the boundaries defining a physical enclosure). Thus, a virtual bounding volume can be disposed within an open combustion environment or disposed within a volume within an enclosure that is not defined by the enclosure itself. A plurality of environmental sensors 20, such as temperature sensors (e.g., thermal couples, pyrometers, etc.), humidity sensors, atmospheric pressure sensors, wind sensors and others, may be provided within the open combustion environment.

A hydrocarbon input line (HC in) feeds into the flare 12 for delivery of hydrocarbon materials to the flare. To measure gas composition and mass flow of the hydrocarbon line HC in, a gas composition meter 21 and a flow rate meter 22 are disposed, e.g., in series, along the hydrocarbon input line. The gas composition meter 21 can be embodied in any suitable device for measuring gas composition of the hydrocarbon materials. Example gas composition meters 21 include, but are not limited to, gas chromatographs and density meters. The flow rate meter 22 can be embodied in any suitable device for measuring a mass flow rate along the hydrocarbon input line HC line. Example flow rate meters 22 include, but are not limited to, Coriolis meters, orifice meters, Venturi meters, etc. If the gas composition or the mass flow rate is already known or can be otherwise determined, the gas composition meter 21 and flow rate meter 22 can be omitted.

Suitable communication links such as cables 24 (or other signal transferring links, such as wireless communication links, etc.) connect the multi-spectral image-capturing devices 18 and the environmental sensors 20 to the computing device 14, which may also have digitization, storage, and user interface capabilities. The gas composition meter 21 and a flow rate meter 22 are preferably also in communication with the estimation unit 10 and/or the computing device 14, such as via cables (not shown), or other signal transferring links, such as wireless communication links, etc., examples of which will be appreciated by those of ordinary skill in the art. The computing device 14 receives environment-related outputs or signals from the environmental sensors 20 and image sequences from the multi-spectral image-capturing devices 18, and outputs from the gas composition meter 21 and a flow rate meter 22 (if not already known) to set proper parameters of the image-capturing devices for performing subsequent calibration, registration and estimating temperature-radiance field within the virtual bounding volume.

It is useful for an operator to optimally set the parameters related to a combustion process for maximum product yield, maximum energy efficiency, and minimum flue gas consumed. Often, the operator selectively controls the combustion process based on a visual estimation of a state of the process at specific locations in a combustion environment, such as locations near the flare 12. In example methods, acquiring the states of the process can be performed based on a three-dimensional temperature and radiance field at the virtual bounding volume.

In an example embodiment, three-dimensional temperature and radiance fields are computed from a set of images, which are captured by optimally placed multi-spectral image-capturing devices 18 surrounding the virtual bounding volume (which, in turn, can surround the flame and emissions from the flare 12). The virtual bounding volume includes virtual surfaces, on which pixels or points can be located. As shown in FIG. 1, the plurality of multi-spectral image-capturing devices 18 are disposed so that they are trained on the flare 12, and the plurality of environmental sensors 20 are disposed at selected locations in the combustion environment for collecting data. The estimation unit 10 calculates and determines the temperature and radiance fields of the virtual bounding volume based on the collected data.

Figure 2:
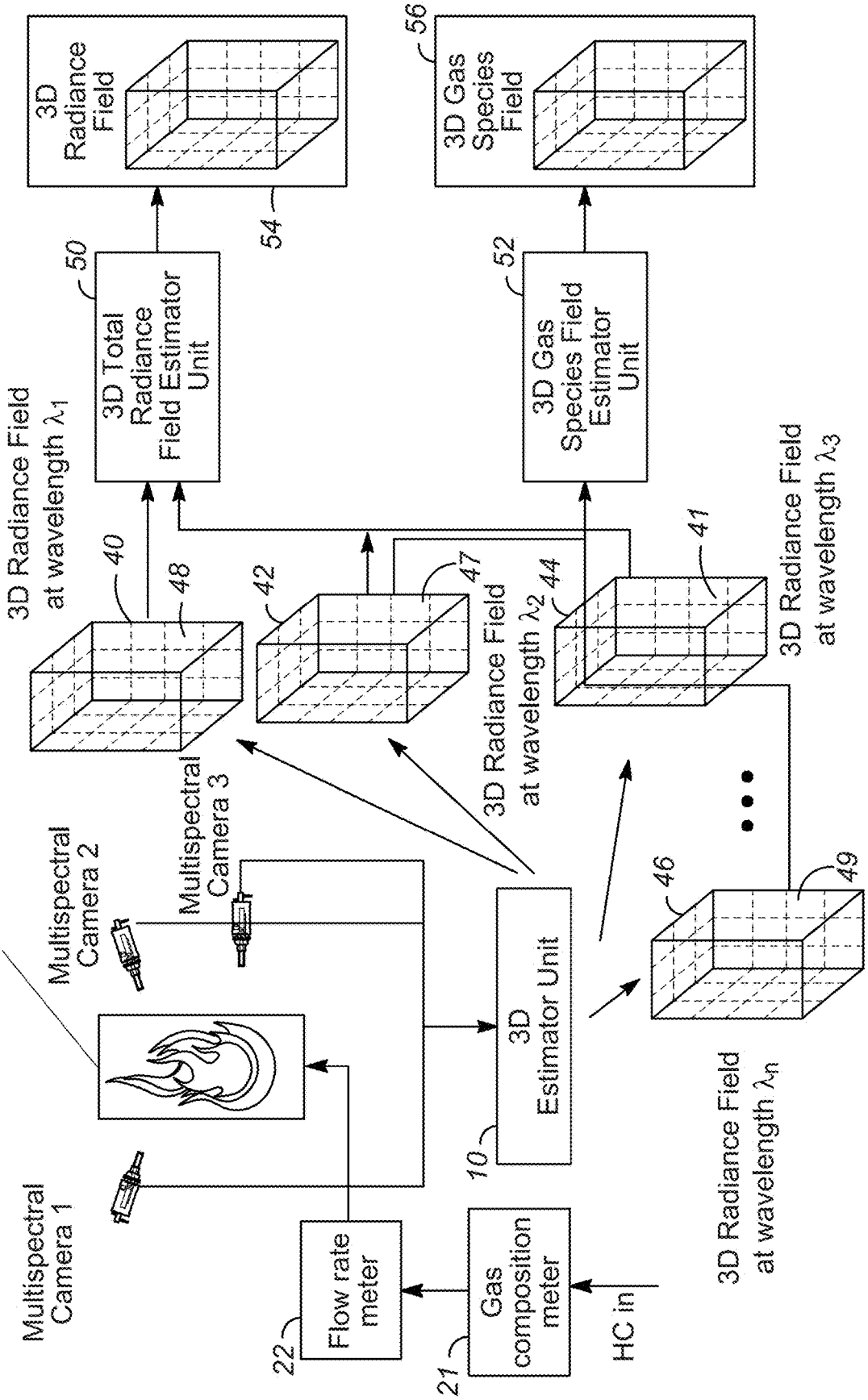
FIG. 2 illustrates an exemplary system for a 3D radiance field and gas species field estimation using the camera system shown in FIG. 1.

Referring now to FIG. 2, a schematic flow diagram of the three-dimensional radiance and gas species field estimation system illustrates high level processes and the outputs of each process. The estimation unit 10, here embodied in a 3D radiance field estimator unit, computes the three-dimensional radiance fields within the virtual bounding volume. Each three-dimensional radiance field corresponds to a particular spectral wavelength, $\lambda_i$. Having received the multi-spectral images from the multi-spectral image capturing devices 18, embodied in FIG. 2 as multi-spectral cameras, the estimation unit 10 segregates the multi-spectral images into groups of images, each group corresponding to images of a spectral wavelength, $\lambda_i$. Using each group of images of a spectral wavelength, $\lambda_i$, the 3D radiance field estimation process, an example of which is discussed below with respect to FIG. 3, generates a 3D radiance field at wavelength, $\lambda_i$. As a result, groups of 3D radiance fields at wavelengths, $\lambda_{1,2,3,\ldots,n}$, 40, 42, 44, . . . , 46 are generated. The different wavelengths may correspond to spectral bands in the visible spectrum, e.g., red, blue and green, or other spectral bands of the ultra-violet, mid-wave infrared and long-wave infrared spectra.

Each of the 3D radiance fields 40, 42, 44, 46 include the voxels, 48, 47, 41 and 49 respectively. A 3D radiance field is composed of voxels. A voxel represents a 3D volume region in the virtual bounding volume. Each voxel has an estimated value of the radiance at the wavelength $\lambda_i$ in a corresponding volume. A 3D total radiance field estimator unit 50 combines two or more outputs of 3D radiance fields at different wavelengths. The result is a total 3D radiance field 54. For example, the total radiance can be computed in the visible spectrum by summing the radiance fields from red, green, and blue wavelengths, as disclosed in more detail below. A 3D gas species field estimator unit 52 detects the presence of gas species and computes their radiance in each of the voxels. The output of the unit 52 is a three-dimensional gas species field 56.

Figure 3:
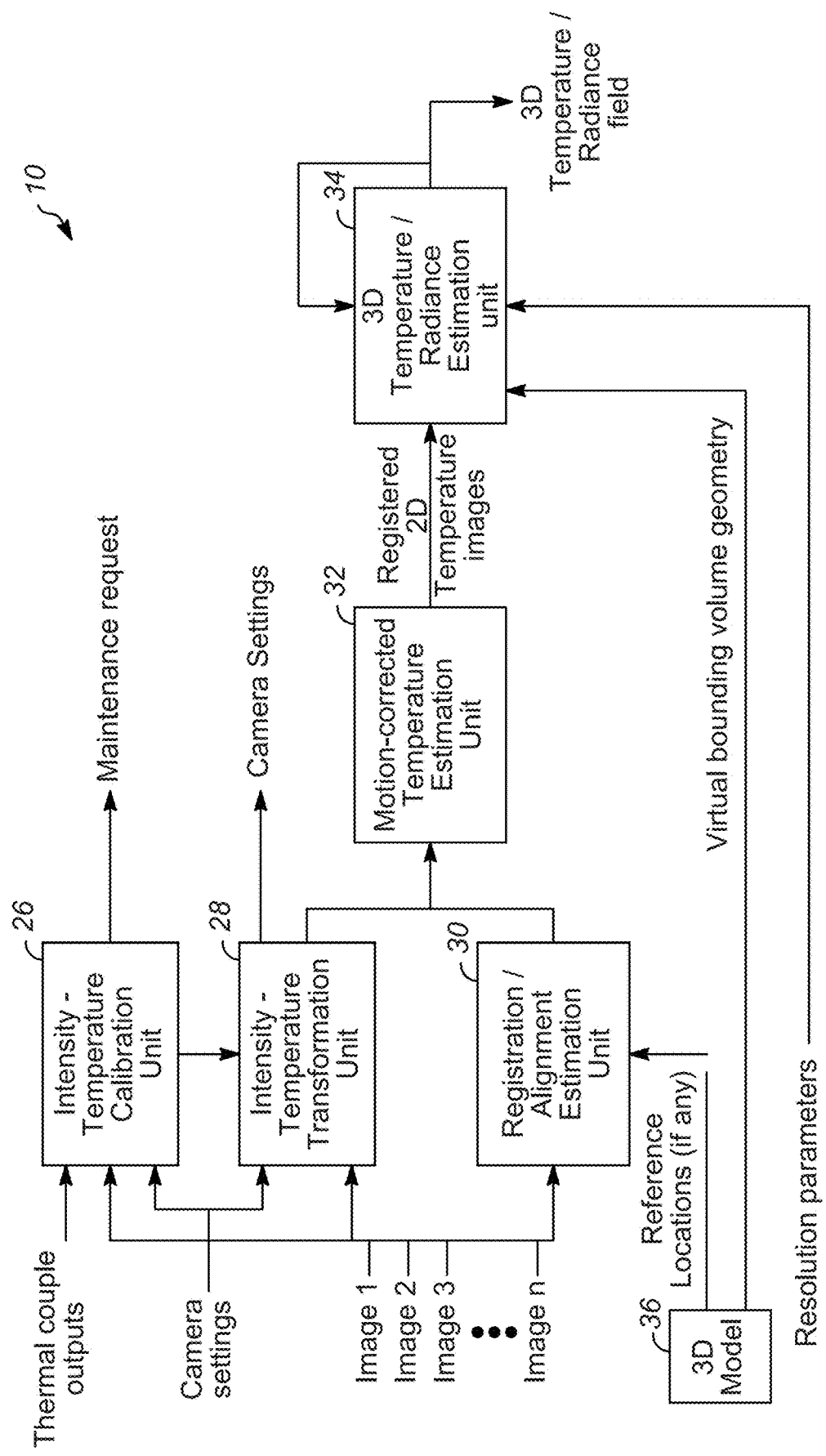
FIG. 3 is a functional block diagram of an example process featuring functional units in accordance with an embodiment of the present disclosure.

Referring now to FIG. 3, an example method performed by the estimation unit 10 is disclosed for computing a 3D radiance field from a group of images at spectral wavelength $\lambda_i$. Included in the example estimation unit 10 are an intensity-temperature calibration unit 26, an intensity-temperature transformation unit 28, a registration and alignment estimation unit 30, a motion-corrected temperature estimation unit 32, a 3D temperature-radiance estimation unit 34, and a 3D model determining unit 36 for determining a 3D model representing the geometry of the virtual bounding volume.

Intensities of the image pixels received from the multi-spectral image-capturing devices 18 are related to the temperatures of viewed surfaces in the virtual bounding volume. Calibration is performed to establish this relationship between the temperatures and intensities. According to Stefan-Boltzmann law, the radiant flux is proportional to the fourth power of the temperature. Thus, a transformation from image intensity to radiance can be established based on the intensity to temperature relationship. Herein temperature and radiance are used interchangeably.

Environmental factors can affect the relationship between the received radiance and the emitted radiance. For example, in an open combustion environment, environmental parameters such as humidity, atmospheric pressure, temperature, can have a significant effect. The environmental sensors 20 disposed in the combustion environment can be used to provide inputs for calibrating this relationship and adjusting the emitted radiance accordingly.

For example, conventional calibrations can be performed based on an infrequent and inadequately updated off-line process. However, the image-capturing device response could become unstable in extreme environmental conditions and/or dynamic operating conditions. An unstable response can render errors related to intensity-temperature transformation due to the stale off-line calibration.

In an example embodiment of the present system and method, the environmental sensors 20 are placed at selected locations in the combustion environment. The environmental sensors 20 are either linked directly to the estimating unit 10 or to the computing device 14, or are viewed or read by one or more of the multi-spectral image-capturing devices 18, or one or more (visual) image capturing devices (not shown), and the results fed to the estimating unit or computing device. The intensity-temperature calibration unit 26 performs an on-line calibration determining a relationship between an intensity of an image pixel and an actual temperature, which can be established in an example method by using polynomial regression mapping temperature outputs and the corresponding pixel intensities from the multi-spectral image-capturing devices 18 with associated device settings.

The intensity-temperature calibration unit 26 also maintains records of the intensity-temperature calibration in a storage device, and compares the calibration data on-line during the combustion process. As the responses from the multi-spectral image-capturing devices 18 become degraded, the lenses of the devices become dirty, etc., current intensity-temperature calibration values differ from original or initial values in the record. The intensity-temperature calibration unit 26 preferably calculates the difference between the original value and the current values. When the difference exceeds a predetermined threshold, such as 15% (though any other threshold can be used), the intensity-temperature calibration unit 26 flags (outputs) a maintenance request indicator to signal that system maintenance is required. The predetermined threshold can vary depending on the application, and can be edited by the operator.

Based on the intensity-temperature calibration, the intensity-temperature transformation unit 28 transforms the intensities of the corresponding images to the temperature values based on the multi-spectral image-capturing device settings (e.g., camera settings as shown in FIG. 3) and the image pixels from the acquired images, e.g., images 1 . . . n. An exemplary intensity-temperature calibration unit 26 and intensity-temperature transformation unit 28 are disclosed in commonly assigned U.S. patent application Ser. No. 14/306, 063, which is incorporated by reference in its entirety.

A dynamic range of image pixel values is limited to a number of bits per pixel. However, the temperature of the combustion process can reach up to 2500° F. or 1400° C. To cover an entire temperature range (e.g., 0-2500° F. or 0-1400° C.) the multi-spectral image-capturing device 18 parameters or settings, such as aperture, shutter, and gain, can be selectively set and adjusted. During this intensity-temperature transformation, an intensity histogram of the image is evaluated by the intensity-temperature transformation unit 28. If the histogram is skewed or becomes uneven at a low or high end, the intensity-temperature transformation unit 28 makes appropriate changes in the parameters or settings of the multi-spectral image-capturing devices 18. This enables acquisition of the images with an optimal intensity range under the current operating conditions.

Unwanted movement of the multi-spectral image-capturing devices and imaging areas in the combustion environment may occur. Since a temperature field computation relies on an accurate line of sight association with the physical structure, significant errors result if a relative motion of the multi-spectral image-capturing device 18 is not correctly set and adjusted, particular for a high resolution temperature field computation. Correction of these unwanted movements can be accomplished in an example embodiment by the registration and alignment estimation unit 30 and the motion-corrected temperature estimation unit 32.

The registration and alignment estimation unit 30 computes a registration and alignment estimation for each of the multi-spectral image capturing devices 18 viewing the virtual bounded volume. Characteristic features that are distinct and easily recognizable in the multispectral image, such as portions of the flare 12 or other surrounding features, are initially selected and subsequently detected. Their positional information in the image is associated with the three-dimensional geometrical coordinates of the virtual bounded volume, which can be determined from the 3D model of the virtual bounded volume as determined by the 3D model determining unit 36. Readily recognizable markers (not shown) may be placed in the combustion environment, and geometrical locations of these characteristic features may also constitute reference points for the virtual bounding volume, though this may be more difficult in particular open combustion environments. Corresponding pixel coordinates in the multi-spectral images can be correlated with the geometrical locations of such markers.

The registration and alignment estimation unit 30 calculates a perspective transformation of the multi-spectral images based on either or both of these two sets of data, i.e., the geometrical reference points and the corresponding image pixel locations. After an application of the transformation on the temperature images, two-dimensional (2D) temperature images are aligned and registered by the registration and alignment estimation unit 30.

The motion-corrected temperature estimation unit 32 performs the perspective transformation on the temperature (radiance) image, which is computed from the intensity-temperature transformation unit 28, such that the geometrical reference points and the corresponding image pixel locations are in alignment. In other words, the same pixel location represents the same physical location within the virtual bounding volume in the sequence of images. The correct temperatures within the virtual bounding volume are determined based on the corresponding image pixels even under relative motion of the multi-spectral image capturing devices 18. The output is a registered temperature image.

The 3D temperature-radiance estimation unit 34 applies a hierarchical, multi-resolution method to compute a three-dimensional temperature-radiance field of the virtual bounding volume based on the registered two-dimensional temperature images. When an operator is interested in certain areas or volumes in the combustion environment, higher resolution may be desired, but lower resolution may be sufficient for other areas. For example, a hierarchical coarse-to-fine algorithm can be used to achieve or perform this multi-resolution method. An exemplary hierarchical, multi-resolution method is disclosed in commonly assigned U.S. Pat. No. 9,212,851, which is incorporated by reference in its entirety.

For example, the 3D temperature-radiance estimation unit 34 calculates the 3D temperature field based on a coarse resolution (e.g., a 1 cubic feet resolution) as mentioned above. The next resolution 3D temperature field (e.g., 0.125 cubic feet) may then be computed from the results of the initial resolution. The temperature field with fine resolution can be iteratively computed. However, only areas of interest and associated voxels need to be traversed down the hierarchy to the fine resolution. Inverses of matrices calculated using a radiative transfer equation are required in each resolution computation. With this hierarchical, multi-resolution method, computational time can be significantly saved during computation, and thus can be used as a real-time, on-line application. The above 3D radiance field estimator 11 is applied to groups of spectral images at wavelength $\lambda_i$ resulting in many 3D radiance fields, each at a specific wavelength $\lambda_i$.

Referring again to FIG. 2, the 3D total radiance field estimator unit 50 combines one or more 3D radiance fields to form a total radiance field of a broader spectrum, including, for example, visible or mid-wave infrared. Depending on the application, one of several combination methods, such as weighted sum, sum of interpolation and extrapolation, can be applied. A weighted sum method computes the total radiance as the sum of the products of radiance at wavelength $\lambda_i$ and weight $w_i$. For example, the visible spectrum radiance is often computed by a weighted sum of red, green and blue radiances. An example sum of interpolation and extrapolation method first extrapolates or interpolates radiance at other wavelengths and then sums all the original, interpolated and extrapolated radiances. The result is a total 3D radiance field 54, which is further described in FIG. 4.

As shown in FIG. 4, voxels 60, 62, 64, 66 and 68 are examples of different voxels in the total 3D radiance field 54, which can be defined by the virtual bounding volume. In this example, it can be seen that the voxel 62 is of a smaller size compared to the voxel 60. The voxel 60 is estimated to have a radiance value of $R_1$. Similarly, voxels 64 and 68 are shown to have output radiance estimates of $R_2$ and $R_3$, respectively. Each voxel, e.g., voxel 66, has a radiance output value of $R_n$.

Referring again to FIG. 2, the 3D gas species field estimator unit 52 detects and computes the composition of different gases in the virtual bounding volume based on groups of 3D radiance fields at a selected wavelength $\lambda_i$. Radiance of each voxel in a radiance field at the selected wavelength can be contributed from that of the gas species and air in that voxel. Spatial and temporal filtering is applied to each voxel to estimate and remove its radiance due to air. The residual radiance is due to the gas species. A radiance feature vector is generated from the corresponding voxels in the groups of radiance fields. For example, the residual radiance from voxels 48, 47, 41, and 49 forms a radiance feature vector. Classification methods, such as a support vector machine, random forest, Bayesian model, etc., determines the presence or absence of the target gas species. The radiance of the gas species in the output voxel can be estimated from the strength of the radiance feature vector. Compiling the results from each voxel creates the 3D gas species field 56.

In another embodiment, the 3D gas species field 56 can be computed with a function of a threshold value or gradient in selected 3D radiance fields of specific wavelengths $\lambda_i$. For example, a voxel having high radiance or high radiance gradient relative to the average of its surrounding voxels in the visible spectrum and that same voxels having threshold value or gradient value in the blue wavelength implies the presence of hydroxyl in that voxel. A voxel having high radiance or high radiance gradient relative to the average of its surrounding voxels in the visible spectrum and that same voxels having threshold value or gradient value in the green wavelength implies hydrogen combustion in that voxel. A voxel having high radiance or high radiance gradient relative to the average of its surrounding voxels in the visible spectrum and that same voxels having threshold value or gradient value in the yellow wavelength (combination of red and green wavelengths) implies carbon cracking within a flame in that voxel. The resulting functional values can be used directly or correlated with a data table of known concentrations relative to the signal strength of the function.

Referring now to FIG. 5, the output 3D gas species field 56 is described in greater detail. Voxels 70, 72, 74, and 76 have different gas species as detected by the 3D gas species field estimator 52. Same gas species often occurs at groups of voxels, such as a region 78, which is a region consisting of, e.g., $CH_4$ (methane). A voxel in the 3D gas species field may not have a gas species. It may have only air in that voxel. Accurate detection of gas composition and concentrations help optimize the burner efficiency and increase the total system yield.

According to another example monitoring method for an open combustion environment, a multiple-view (multi-view) multi-spectral method and system for flare monitoring will now be described with reference to FIGS. 6-19. Such example monitoring methods and systems are applicable to monitoring an open flame for a single flare stack or a field of flares. Example monitoring methods can provide continuous (e.g., 24×7) and remote hydrocarbon destruction removal efficiency (DRE) measurement, as well as estimations of concentrations of gas species of interest (e.g., CO, $CO_2$, $NO_X$, $MH_4$, ... ), amount of smoke, and combustion efficiency (CE).

Destruction Removal Efficiency (DRE) can be defined as:
$DRE_{VOC} = 1 - C_{VOC\_out}/C_{VOC\_in}$.

Combustion Efficiency (CE) can be defined as:
$CE = C_{CO2\_out}/(C_{HC\_out} + C_{CO2\_out} + C_{CO\_out})$.
where
$C_{xxx\_out}$ is the output concentration of element xxx,
$C_{xxx\_in}$ is the input concentration of element xxx,
VOC is Volatile Organic Compound,
HC is Hydrocarbon While some conventional methods have been used to measure CE in some environments, there are significant difficulties and challenges in measuring DRE, especially in an open combustion environment. For instance, because flame is voluminous, a monitoring region for a flame includes not one homogeneous structure, but many regions of combustion zone including, e.g., inner, middle, and outer cores, as well as a non-combustion zone, where unburnt fuel and byproducts are dispersed into the environment. In an example monitoring method, the monitoring region for the flame (or flames) is provided within a virtual bounding volume.

Figure 6:
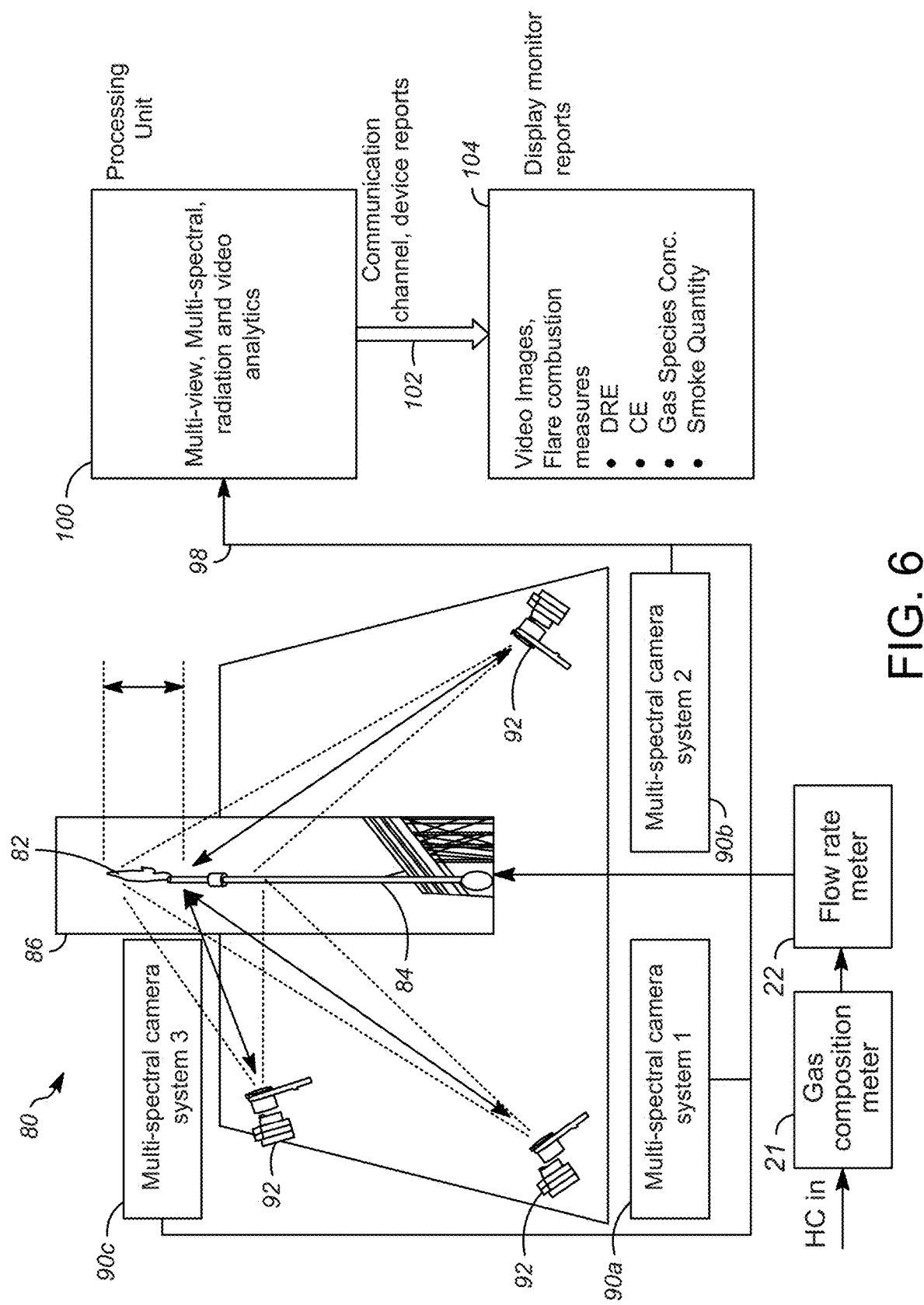
FIG. 6 illustrates an example multi-view, multi-spectral system for flare monitoring, according to another embodiment of the invention.
Figure 10:
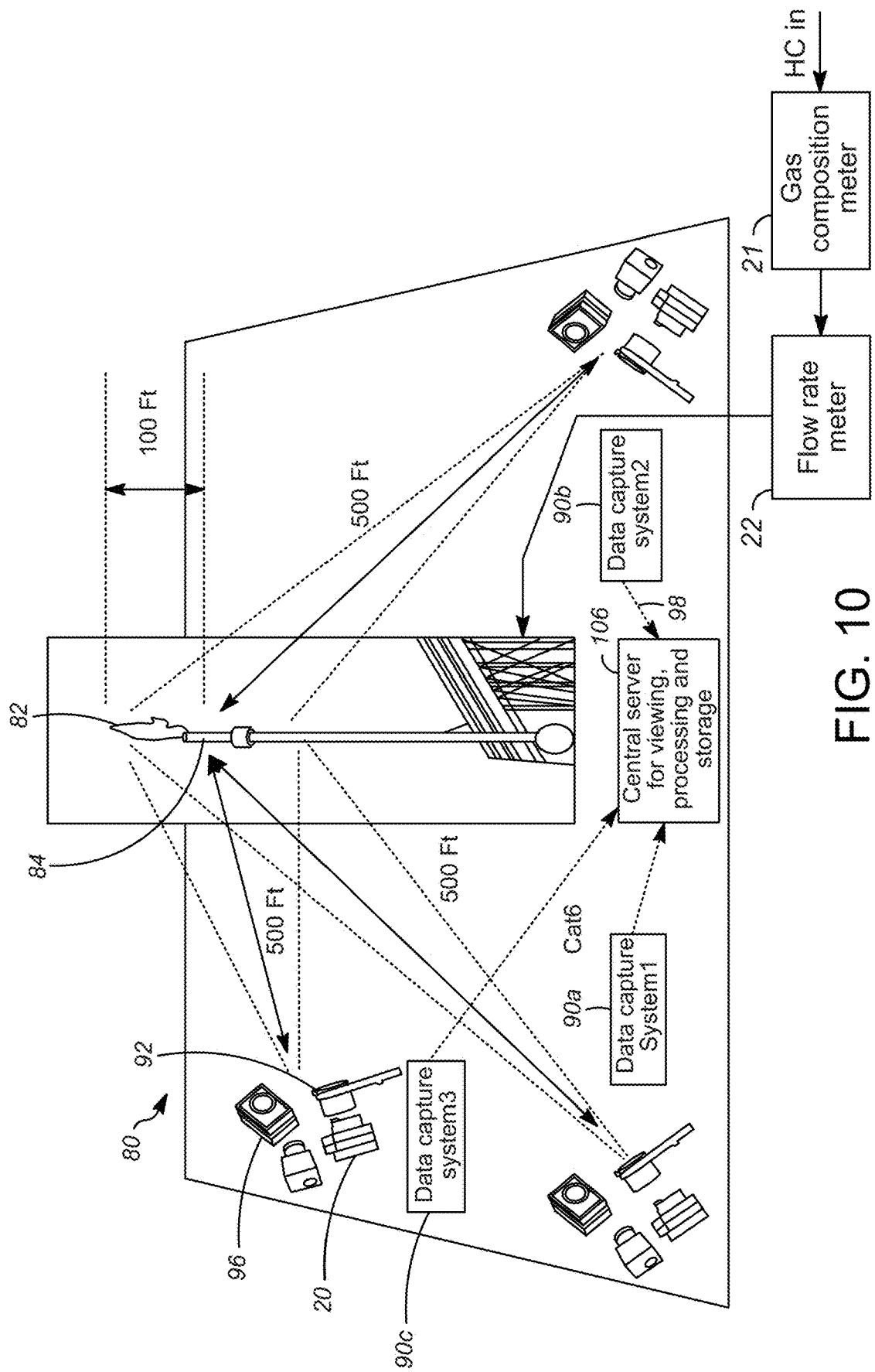
FIG. 10 shows an example arrangement of multi-view, multi-spectral imaging subsystems in an open combustion environment surrounding a flare.

An example multi-view, multi-spectral system 80 for flare monitoring is shown in FIGS. 6 and 10. A flame 82 at the end of a flare 84 is disposed in an open combustion environment 86; that is, the flame 82 is not disposed within a complete enclosure. Though a single flare 84 is shown in FIG. 6, two, three, or other plurality of flares (i.e., a field of flares) may be provided in the open combustion environment. A plurality of multispectral imaging subsystems 90a, 90b, 90c, part of the multi-view, multi-spectral system 80, are disposed about the flare 84. Each multispectral imaging subsystem includes one or more image-capturing device. The image-capturing device in some example embodiments can include a multi-spectral image capturing device, which in a non-limiting example is embodied in a camera with multiple narrow band filters 92. Though example embodiments are described herein with respect to multi-spectral image capturing devices, such description can also be applied to image capturing devices generally. At least two multispectral imaging subsystems, e.g., 90a, 90b, are used, which are disposed at different perspectives about the flare 84. However, the number of multispectral imaging subsystems, and perspectives, can be three, four, five, six, or greater.

The multispectral imaging subsystems 90 are disposed at respective vantage points about the flare 84 and trained on the flame 82. The multispectral imaging subsystems 90 can be fixedly positioned, e.g., by being incorporated into stationary devices fixed (e.g., mounted) at particular locations, or can be movably (transiently) positioned, e.g., by disposing the imaging subsystems in movable configurations. Examples of movable devices include vehicles, movable mounts, movable platforms, drones, etc. If the multispectral imaging subsystems 90 are movably positioned, a location of the multi-spectral image cameras at time that an image is acquired can be determined by, e.g., global positioning systems (GPS), geo-locators, controllers for the movable devices (e.g., which can store coordinates), position detectors, etc. The respective vantage points shown in FIG. 6 are only examples, and those of ordinary skill in the art will appreciate that the multispectral imaging subsystems 90 may be arranged in other configurations to view the flame 82.

The multi-spectral cameras 92 are embodied in any suitable camera or imaging device capable of imaging the flame 82 in multiple spectra (wavelengths), though it is not required that multiple spectra be imaged simultaneously in a single camera. Example multi-spectral image cameras 92 include, but are not limited to, charge-coupled device (CCD) cameras, ultraviolet (UV) cameras, mid-wave infrared (MWIR) cameras, near-wave infrared (NWIR) cameras, long-wave infrared (LWIR) cameras, or any combination of these. The multi-spectral cameras 92 can include one or more spectral band selectors, such as spectral filters, beam splitters, etc. for imaging at selected spectral bands. The multi-spectral cameras 92 are preferably configured to acquired images in at least one spectral band that corresponds to a dominant emission characteristic of a gas of interest. An example multi-spectral camera 92 is a thermal camera with a filter wheel having multiple spectral filters. Another example multi-spectral camera 92 includes a beam splitter that filters input radiance into multiple spectral bands. All spectral bands may be sensed by a thermal focal plane array, or each band may be sensed by a thermal focal plane array.

Figure 7:
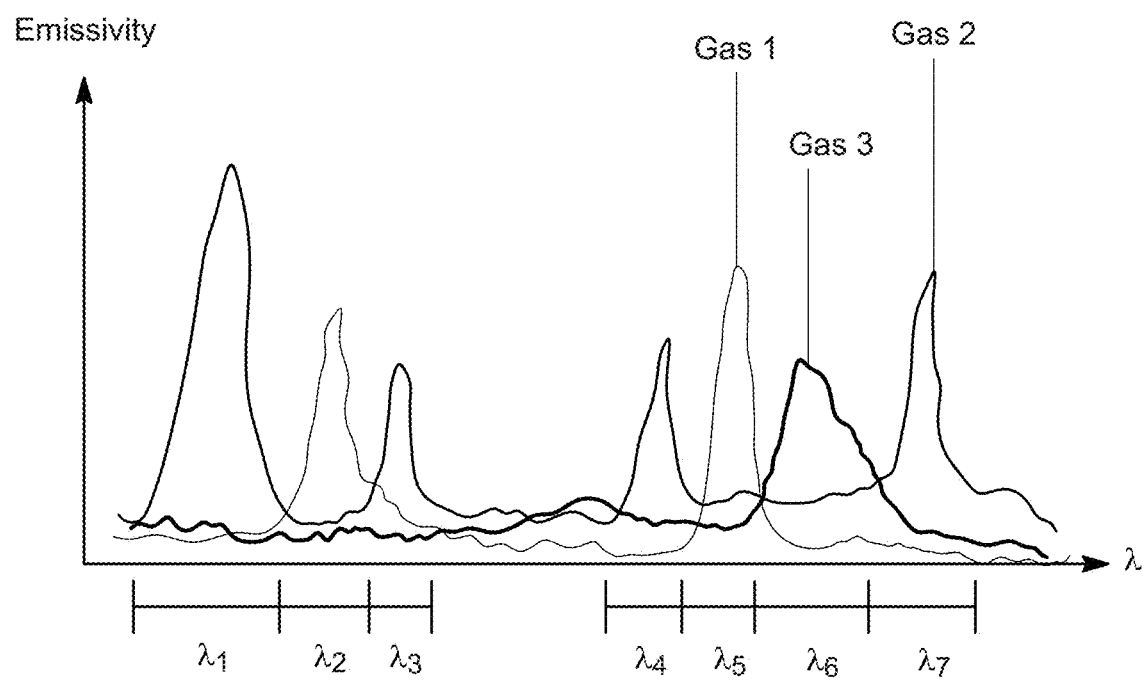
FIG. 7 shows an example indicating emissivity of three gases which may be emitted from the flare of FIG. 6 across multiple spectral bands (wavelengths)

FIG. 7 shows an example indicating emissivity of three gases which may be emitted from the flare 84 across multiple spectral bands (wavelengths). The selection of spectral bands, Xi, is based on the amplitudes of the emissivity (a function of wavelength) of the gases of interest and their relative amplitude. One spectral band preferably has no or very small emissivity for all gases. As such, this band will be approximate to a so-called black body emission, which can be used to estimate the regional temperatures of the flame. Alternatively, spectral bands that have strong emissivity of a gas species of interest, e.g., $CO_2$, or $H_2O$, can be selected for gas temperature estimation. Other desirable spectral bands are those having large emissivity for one gas and minimal emissivity for other gases. Often, a spectral band with high emissivity for one gas, e.g., $\lambda_6$ as shown in FIG. 7, also has small emissivity for the other gases. However, such bands can still be selected in example methods disclosed herein.

Referring again to FIG. 10, each multispectral imaging subsystem 90*a*, 90*b*, 90*c* can also include one or more color video cameras 96 trained on the flame 82. Such color video cameras can have near infrared (NIR) cutoff filter on-off capability, though this is not required in all embodiments. Each multispectral imaging subsystem 90*a*, 90*b*, 90*c* preferably further includes the environmental (auxiliary) sensors 20. Example environmental sensors 20 include a thermometer for measuring ambient air temperature, and a humidity sensor for measuring the amount of water in the air. In some example methods, information with less accuracy can be obtained from a weather station without the environmental sensors 20. Each multispectral imaging subsystem 90*a*, 90*b*, 90*c* can be considered a data capture system for capturing data for the flame(s) 82. It is also contemplated that the environmental sensors 20 can be shared between multiple multispectral imaging subsystems 90*a*, 90*b*, 90*c*.

As shown in FIGS. 6 and 10, a hydrocarbon input line (HC in) feeds into the flare 84 for delivery of hydrocarbon materials to the flare. To measure gas composition and mass flow of the hydrocarbon line HC in, the gas composition meter 21 and a flow rate meter 22 are disposed, e.g., in series, along the hydrocarbon input line. The gas composition meter 21 can be embodied in any suitable device for measuring gas composition of the hydrocarbon materials. Example gas composition meters 21 include, but are not limited to, gas chromatographs and density meters. The flow rate meter 22 can be embodied in any suitable device for measuring a mass flow rate along the hydrocarbon input line HC line. Example flow rate meters 22 include, but are not limited to, Coriolis meters, orifice meters, Venturi meters, etc. If the gas composition or the mass flow rate is already known or can be otherwise determined, the gas composition meter 21 and flow rate meter 22 can be omitted. The multispectral imaging subsystems 90*a*, 90*b*, 90*c* are linked (e.g., coupled via suitable wired or wireless signal paths 98, either directly or via a network) to a processing unit 100 for providing multi-view, multi-spectral radiation and video analytics. The gas composition meter 21 and a flow rate meter 22 are preferably also in communication with the processing unit 10, such as via cables (not shown), or other signal transferring links, such as wireless communication links, etc., examples of which will be appreciated by those of ordinary skill in the art. The processing unit 100 can be linked via a communication channel or device 102 to one or more output devices 104, such as a display monitor, printer, computer, storage device, etc. The output device 104 in an example embodiment can display video images, and can output reports including flare combustion measures, such as DRE, CE, gas species concentration, smoke quantity, or others. The processing unit 100 and the output devices 104 can be embodied in a computing unit, such as a server 106 (shown in FIG. 10), with the communication channel or device 102 embodied in a bus or other signal path.

Figure 8:
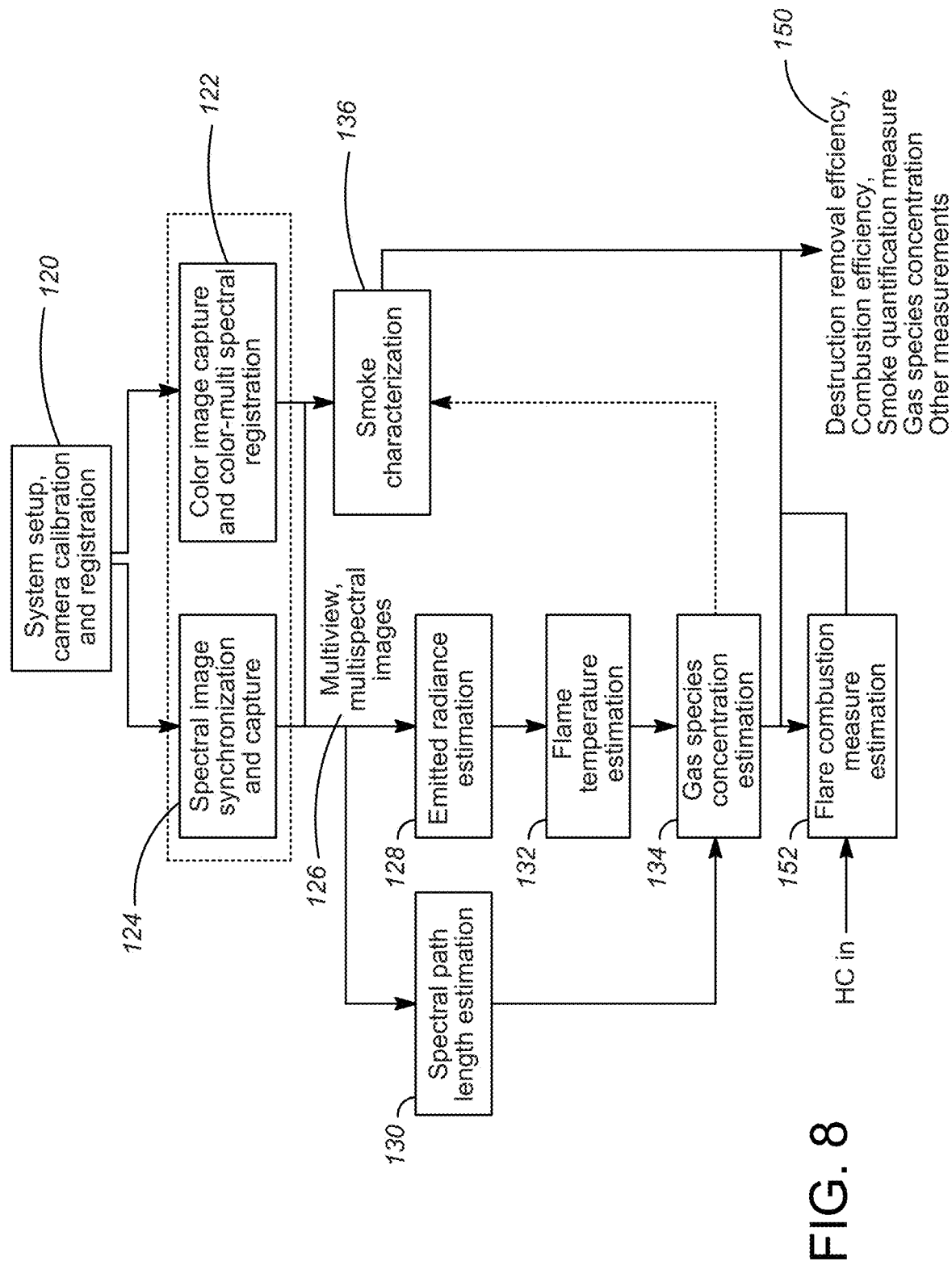
FIG. 8 shows an example process flow chart for a processing unit according to another embodiment of the invention.
Figure 9:
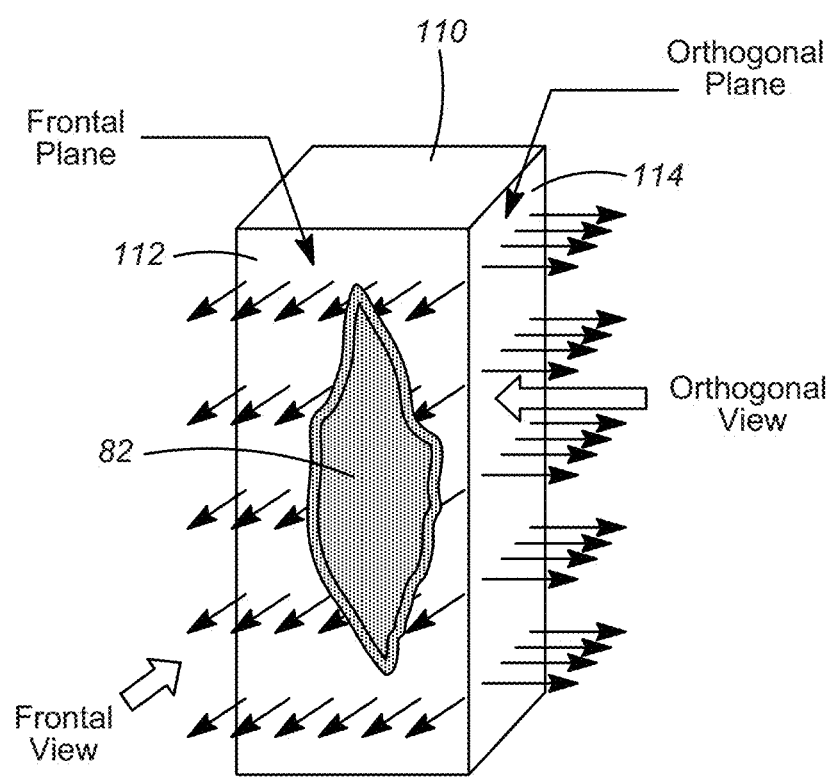
FIG. 9 shows an example virtual bounding volume, illustrating two views and planes.

FIG. 8 shows an example process. In the example process, the processing unit 100 estimates the concentrations of gas species of interest and consequently emission parameters, such as DRE and CE, on the surfaces of a virtual bounding volume (e.g., a rectangular prism or other volume) that surrounds the flame 82 and its intermediate areas. An example virtual bounding volume embodied in a virtual prism 110 is shown in FIG. 9. The example virtual prism has a volume outside of which the gas emission from the flame 82 is minimal. The virtual prism 110 in FIG. 9 is a rectangular prism having a frontal plane 112 with a frontal view, and an orthogonal plane 114 with an orthogonal view. It will be appreciated that other configurations of virtual bounding volumes can be defined surrounding the flame 82 instead of a rectangular prism.

Referring again to FIG. 8, a system setup, camera calibration and registration is performed 120. The example multi-view, multi-spectral system 80 includes three multi-spectral imaging subsystems 90*a*, 90*b*, 90*c*, shown as data capture systems in the example setup of FIG. 10. Each data capture system 90*a*, 90*b*, 90*c* includes the multi-spectral thermal camera 92, the visible (color) video camera 96, and the environmental sensors 20. All of the data capture systems 90*a*, 90*b*, 90*c* are connected via suitable links 98 to the central server 106 including the processing unit 100, communication channel/device 102, and output device 104 for data storage, processing, and viewing.

The multispectral imaging subsystems 90*a*, 90*b*, 90*c* can be arranged in any of multiple configurations with respect to the flame 82. For example, the multispectral imaging subsystems 90 can be fixedly or transiently positioned at various perspectives with respect to the flame, using methods and devices disclosed elsewhere herein. The example configuration shown in FIG. 10 and FIG. 11 includes two of the multi-view, multi-spectral imaging subsystems 90*a*, 90*b* (subsystems 1 and 2) positioned 90 degrees apart (as defined by the location of the respective multi-spectral thermal cameras 92) to capture the flame 82 shape from the flare 84. The third multi-view, multi-spectral imaging subsystem 90*c* (subsystem 3) is positioned equiangular to the other two multi-view, multi-spectral imaging subsystems, so that, as viewed from above in FIG. 11, subsystem 3 is positioned 135 degrees from both subsystems 1 and 2. All of the multi-spectral thermal cameras 92 are trained on the flame 82. Again, this configuration can be a fixed configuration or a transient configuration. However, if the configuration is transient, the location of the multi-spectral cameras 92 at the time that an image is acquired should be either known or determined, e.g., using methods disclosed herein. As a non-limiting example, if one or more of the multi-spectral cameras 92 were mounted on drones or other moving land-based or aerial vehicles, respective locations of the multi-spectral cameras mounted thereon can be determined through methods such as GPS.

An example camera calibration, part of the system setup, camera calibration and registration 120, which may be performed by the processing unit 100, empirically builds a look-up table relating spectral intensity as a function of input radiance, and builds settings for the multispectral cameras 92. A blackbody system or blackbody source with configurable temperature is used for an example indoor, offline calibration. The configurable temperatures should cover the overall range of flare 84 temperatures observed in the field (e.g., up to 2500 degrees C., though this temperature can be more or less than 2500). The multi-spectral thermal camera 92 (e.g., camera with filter wheel, though it may be configured in other ways) is placed at a suitably short distance from the blackbody source such that the imager of the multi-spectral thermal camera captures the full aperture of the blackbody source while covering, in an example method, at least 10×10 pixels in the captured image. The temperature of the black body is increased uniformly in defined increments, and at each temperature step, data is captured for all desired spectral bands (e.g., filter bands). Desired spectral bands may be selected, for instance, as described above with respect to FIG. 7. Emitted radiances of the black body source are computed using the known temperature on the Planck's function. A look-up table of the observed intensities to radiances is then built for all desired spectral bands (e.g., filter bands). This example calibration will be valid for the specific multi-spectral thermal camera parameter settings (e.g., gain, exposure, etc.), which are recorded. Different tables are established for different camera parameters.

Using the Stefan-Boltzmann equation, the radiance is calculated from temperature. This obtains a relation between observed intensity (at a given wavelength) to the emitted radiance.

Figure 11:
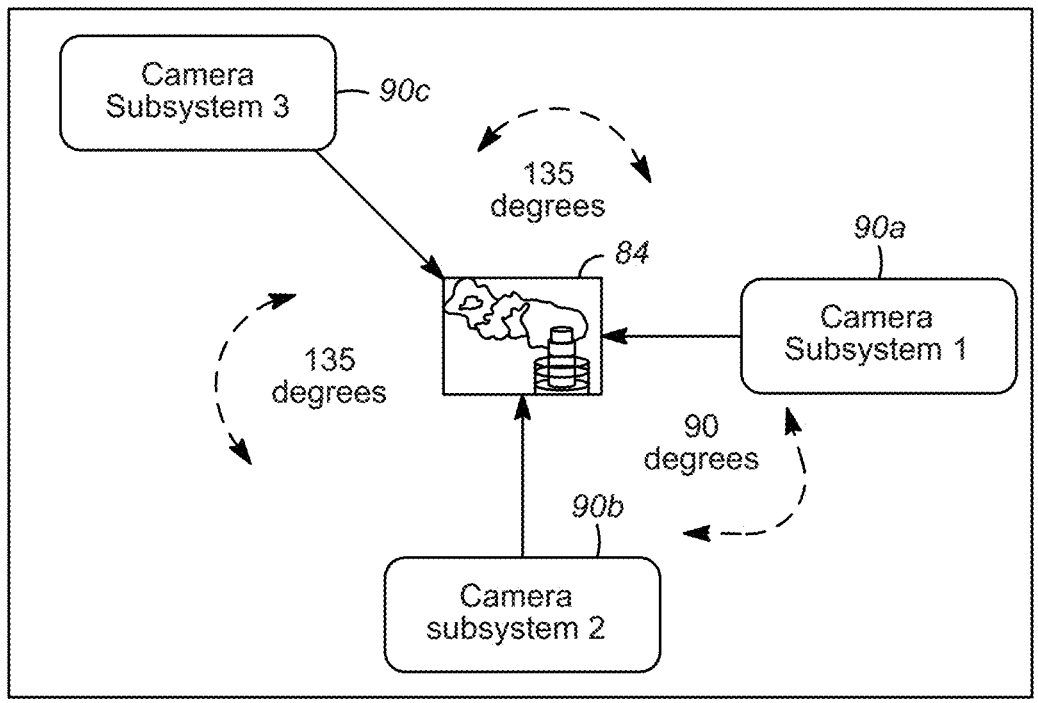
FIG. 11 is a plane (from above) view of the example arrangement of FIG. 10, depicting example vantage points for three multi-view, multi-spectral imaging subsystems.
Figure 12:
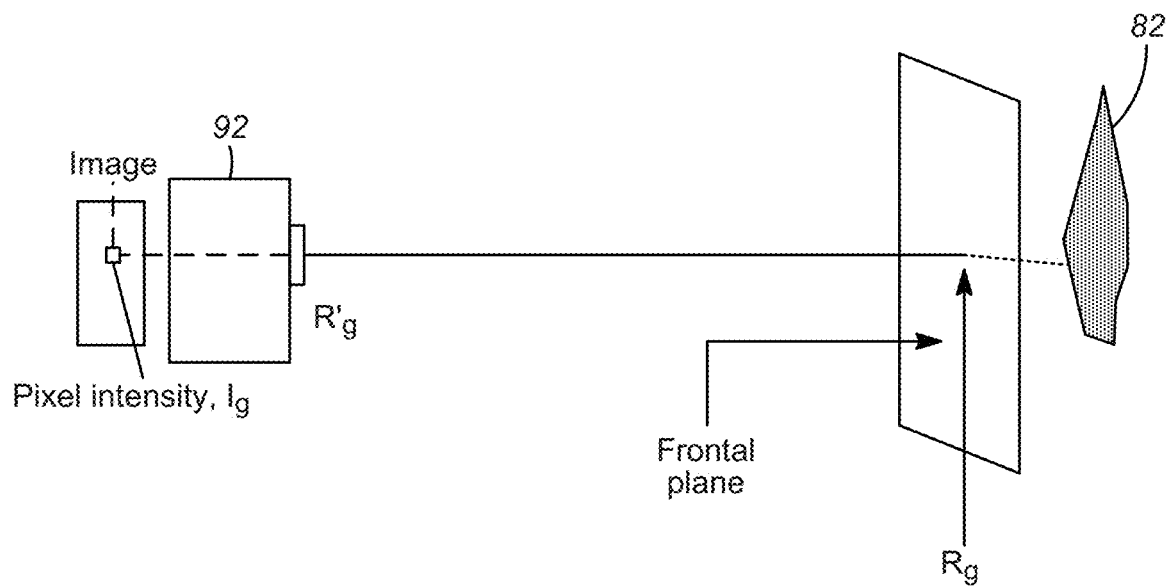
FIG. 12 shows an example depicting the radiation path from the emitted radiance to a pixel of a captured image.

In an example camera registration method 122, inter-camera subsystem registration and intra-camera subsystem registration are performed. In an example inter-camera subsystem registration, extrinsic parameters (e.g., pitch, roll, and distance from the flare 84) are calculated for each of the multispectral imaging subsystems 90a, 90b, 90c. The images obtained from the multispectral thermal cameras 92 are individually corrected for pitch and roll, and then scale transformed, which is estimated using the extrinsic parameters. Calculations and corrections may be performed by the processing unit 100 or by other processing devices. The registered images, which correspond to the captured images from cameras orientations (e.g., as shown in FIG. 11), are at equi-distance and equi-orientation from the flare. The registration is performed independently for the set of multi-spectral thermal cameras 92 and then repeated for the visible cameras 94. The registered images from the multiple camera views are used to construct the 3D virtual bounding volume of the flame.

In an example intra-camera subsystem registration, for each multispectral imaging subsystem 90a, 90b, 90c, the visible 94 and multi-spectral thermal cameras 92 are also registered to one another, using the intrinsic parameters of the two cameras and the extrinsic parameters, which are estimated with standard camera calibration techniques. As the two cameras 92, 94 capture the scene in different spectrums, the scene required for calibration should involve sources which emit radiation in the required spectrums. One example technique for such calibration includes using target patterns which have co-located LEDs in both visible and thermal spectra.

Next, an example spectral image synchronization 124 is performed, e.g., in software. Synchronization may be performed by the processing unit 100 or by a different processing device. A system timestamp is recorded for each image captured by the multispectral cameras 92. For spectral path length estimation, explained further below, a set of images captured by the (e.g., three) multispectral imaging subsystems 90a, 90b, 90c at a given time instant, captured in the same spectral band, are considered. Similarly, images captured in multiple spectral bands are used for gas species estimation, also explained further below. For multi-spectral thermal cameras 92 having filter wheels, example synchronization is achieved by starting the filter wheel in each multispectral imaging subsystem 90a, 90b, 90c at the same time, ensuring that the arrangement of filters in the same. Assuming in a particular example multispectral imaging subsystem that the multispectral camera 92 captures data at a rate of 30 fps, one or multiple images captured in a second interval can be used for processing, though an interval of less than (e.g., fractions of a second) or greater than one second (e.g., 1-10 seconds) can be used. The interval can be selected, for instance, based on the rate of combustion changes to be observed and measured, or based on other factors.

The multispectral imaging subsystems 90a, 90b, 90c captures multiview, (preferably) multispectral images from the flame 124, and outputs the multiview, multispectral images 126. An example of a captured image is provided in FIG. 12. The multiview, multispectral images are processed by the processing unit 100 in any of various ways. In an example emitted radiance estimation method 128, the sensed image intensity $I_g$ from the multispectral camera 92 is converted to radiance at the frontal plane of a flame's emission point $R_g$.

To perform this conversion, first, the image intensity $I_g$ is converted to received radiance, $R'_g$, and then the emitted radiance, $R_g$ is estimated from $R'_g$. To convert the image intensity to received radiance, the processing unit 100 uses the operating parameters of the multispectral camera 92 and the look-up table established during the camera calibration step 120, as described above. Interpolation of the look-up table values may be needed, and example interpolation methods will be appreciated by those of ordinary skill in the art.

The differences between $R_g$ and $R'_g$ are mainly caused by atmospheric attenuation. The amount of atmospheric attenuation can be computed using an atmospheric model, such as MODTRAN™, e.g., as provided in MODTRAN™ 5.2.0.0 User's Manual, Air Force Research Laboratory, which is incorporated herein by reference. Inputs to the atmospheric model include distance from the multispectral camera 92 to the flare 84, and environmental parameters, such as humidity, atmospheric pressure, temperature, etc. These environmental parameters can be obtained from the environmental sensors 20, from onsite or community weather stations, or from other sources. Alternatively, a standard regional atmospheric model can be applied. Once the atmospheric attenuation is computed, the emitted radiance is estimated as a scaled factor of $R'_g$ and atmospheric attenuation.

In an example spectral path length estimation 130, a flare path length in each of multiple spectral bands is calculated using the output registered images 126 from each of the multispectral imaging subsystems at multiple angles, captured in that spectral band. By contrast, in some conventional methods using a single camera, the flare path length is ignored or factored based on an often invalid assumption that gases species in the virtual volume are homogeneous, uniform and symmetric. The spectral path length estimation 130 can also be used to estimate smoke and gas species concentration, as disclosed below.

Figure 13:
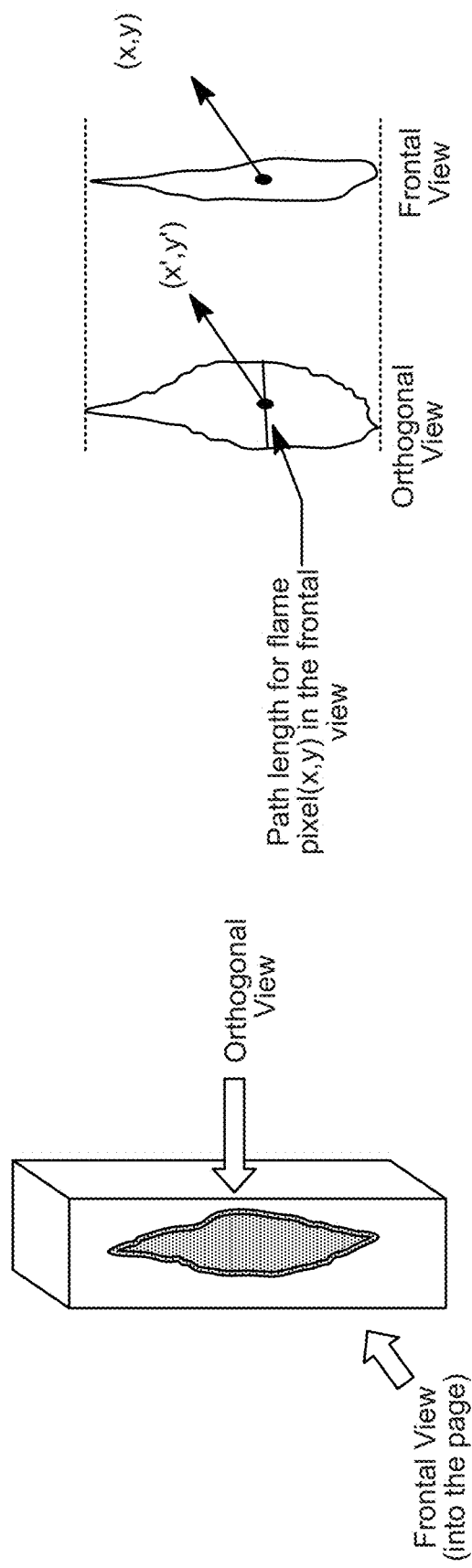
FIG. 13 shows images in a virtual bounding volume from two perpendicular views.

For illustration of a spectral path length estimation method 130, consider output images 126 from two multi-spectral imaging subsystems 90a, 90b, which are perpendicular to each other. The images are registered, and thus the flame 82 occupies the same number of pixels height-wise when viewed in both the frontal and orthogonal views, as shown in FIG. 13. However, the width of the flame 82, which is the same as the depth of the flame for the other view, will be different due to the flare 84 tip design, the dynamics of the combustion processes, and the environmental conditions, such as wind speed.

Figure 14:
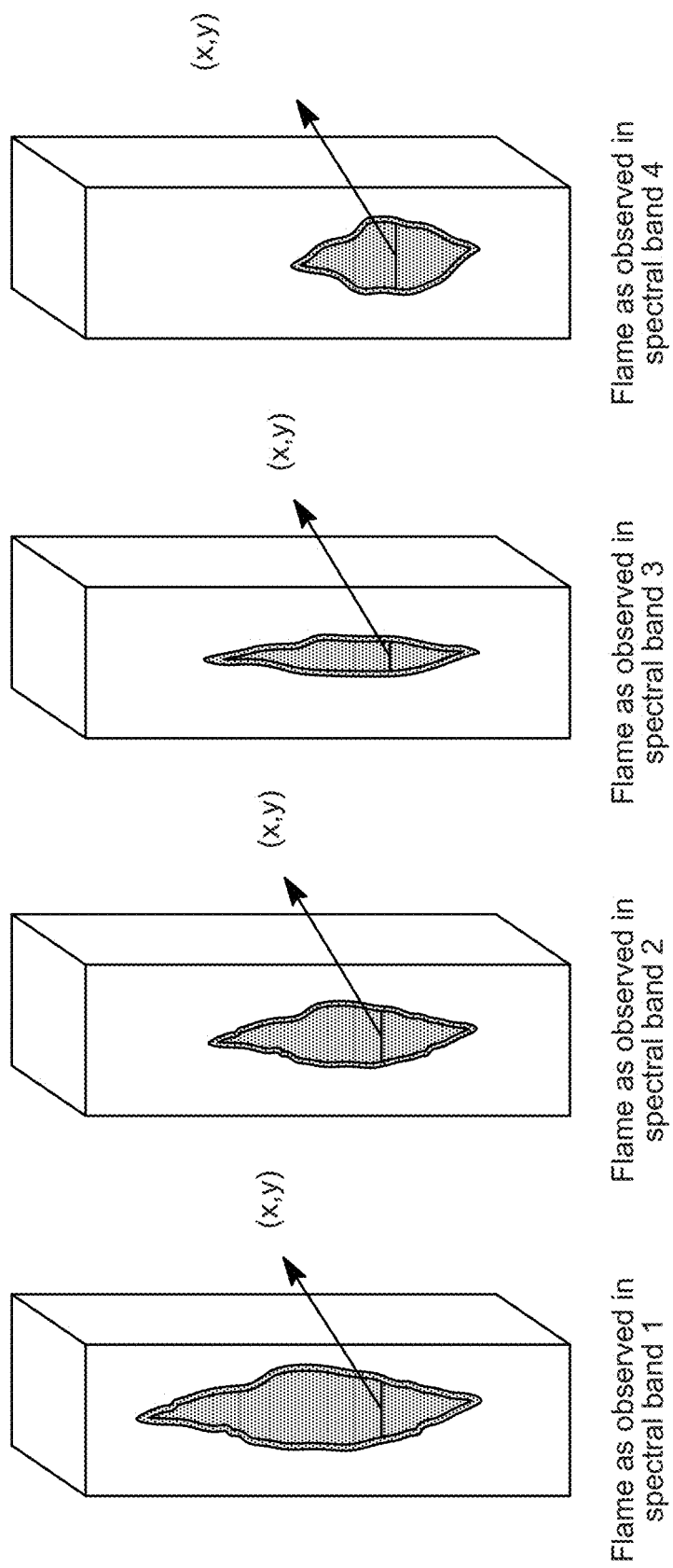
FIG. 14 shows images of the flame of FIG. 13, in multiple spectral bands.

Multiple thresholding techniques such as but not limited to gradient based thresholding can be applied on the flame image to estimate the regional boundaries of the flame and segment the different regions inside the virtual bounding volume, such as, but not limited to, non-flame, outer-flame, middle-flame, and core regions of the flame. Once the boundary of the flame 82 is known, the spectral path length for each flame pixel (x, y) in the frontal view is estimated as the width of the flame at the registered pixel location (x', y') in the image captured in the orthogonal view. If the multi-spectral imaging subsystem 90a, 90b, 90c are not set up to have orthogonal views, the corresponding cosine of deviation from orthogonal is used to estimate the path length from other multispectral imaging subsystems. For transiently positioned multi-spectral cameras, computational complexity can increase as the number of views increases. For a non-flame pixel, the path length is estimated as the width of the virtual bounding volume (e.g., a rectangular prism or cuboid, as shown in FIG. 13) as seen in the orthogonal view. As shown in FIG. 14, the path lengths will be different in each spectral band where the images are captured in the same view at the same time instant in multiple spectral bands.

An example flame temperature estimation method 132 is also provided for estimating a temperature of the gaseous flame 82 so that the blackbody radiation can be estimated. As mentioned above, one of the selected spectral bands does not have emissivity of the gases in the flame. Hence, the radiance is a blackbody radiation, $B(T_g, \lambda)$, according to Planck's law:

$$B(T_g, \lambda) = \frac{2hc^2}{\lambda^5} \cdot \frac{1}{e^{\frac{hc}{\lambda k T_g}} - 1}$$

Based on the above equation, the temperature, $T_g$, can be estimated given the spectral band and the estimated radiance at the point of interest.

An alternative process to estimate the gas temperature 132 uses radiances of two spectral bands where a gas species, e.g., water or $CO_2$, has strong emission. As such the radiance $R(T_g, \lambda_i)$ from a spectral band, $\lambda_i$ can be approximated as $$R(T_g, \lambda) = C \cdot \alpha(\lambda) \cdot L \cdot B(T_g, \lambda)$$

Where C is the concentration of the gas species, $\alpha(\lambda)$ is the emissivity of the gas at spectral band $\lambda$, L is the path length of the gas, and $B(T_g, \lambda)$ is the blackbody radiation at temperature $T_g$ and spectral band $\lambda$. The two unknowns are C and $T_g$ and in particular $T_g$ is of interest. Hence, given two spectral radiances at two spectral bands, the gas temperature $T_g$ can be computed.

The processing unit 100 in an example method further estimates a gas species concentration 134 and smoke concentration 136 from the flame 82. An example method for estimating concentration will be described with respect to FIG. 15. Consider the flame 82 shown in FIG. 15 with a rectangular prism 140 represented as its virtual bounding volume. A monitoring region can be considered as a set of different regions of uniform temperature/radiance $r_1$ to $r_n$ from the center to the outer boundary of the flame 82 to the virtual rectangular prism 140.

The monitoring region is captured from multiple views, an example of which is two perpendicular views, $V_1$ and $V_2$, resulting in sets of images $Im1(\lambda_n)$ and $Im2(\lambda_n)$, where each set includes two images, captured with a band-pass filter with wavelength $(\lambda_{1-n})$.

The total amount of radiance captured at a point $p_i$, $R_{tot}(\lambda_i)$ on the plane perpendicular to the optical axis of the camera 92 in $V_1$, e.g., the frontal plane 142, for a given band $\lambda_i$ can be written as a sum of radiances, $R_{tot}^{r(k)}(\lambda_i)$, for all regions, r(k), k=1 to m, along the line of sight at $p_i$:

$$R_{tot}(\lambda_i) = \sum_{k=1}^{m} \left(R_{tot}^{r(k)}(\lambda_i)\right)$$

For a given band $\lambda_p$, the radiance in a region $R_k$ is the sum of radiance emitted by the different gas species, g(i) for i=1 to n, in that region:

$$R_{tot}^{r(k)}(\lambda_p) = \sum_{i=1}^{n} \left(R_{g(i)}^{r(k)}(\lambda_p)\right)$$

Radiance of a gas $g_i$ in a region $R_k$ is approximated by Taylor series on Plank's function:

$$R_{g(i)}^{r(k)}(\lambda_p) = C_{g(i)}^{r(k)} \cdot B(T_g, \lambda_p) \cdot \alpha_{g(i)}(\lambda_p) \cdot L_{g(i)}^{r(k)}(\lambda_p)$$

where $C_{g(i)}^{r(k)}$ is the concentration of the gas $g_i$ in region $r_k$, $B(T_g, \lambda_p)$ is the black body radiation at temperature $T_g$, at wavelength $\lambda_i$, $\alpha_{g(i)}(\lambda_p)$ is the absorptivity of gas $g_i$ in band $\lambda_p$, and $L_{g(i)}^{R(k)}(\lambda_p)$ is the depth of the gas i in region r(k) at band $\lambda_p$, measured using the image captured in View$_2$ (orthogonal view 144) for a given region $r_k$. For any given observation path dissecting the virtual volume, it passes through one or more regions ($r_1$-$r_k$) of the flame.

Figure 15:
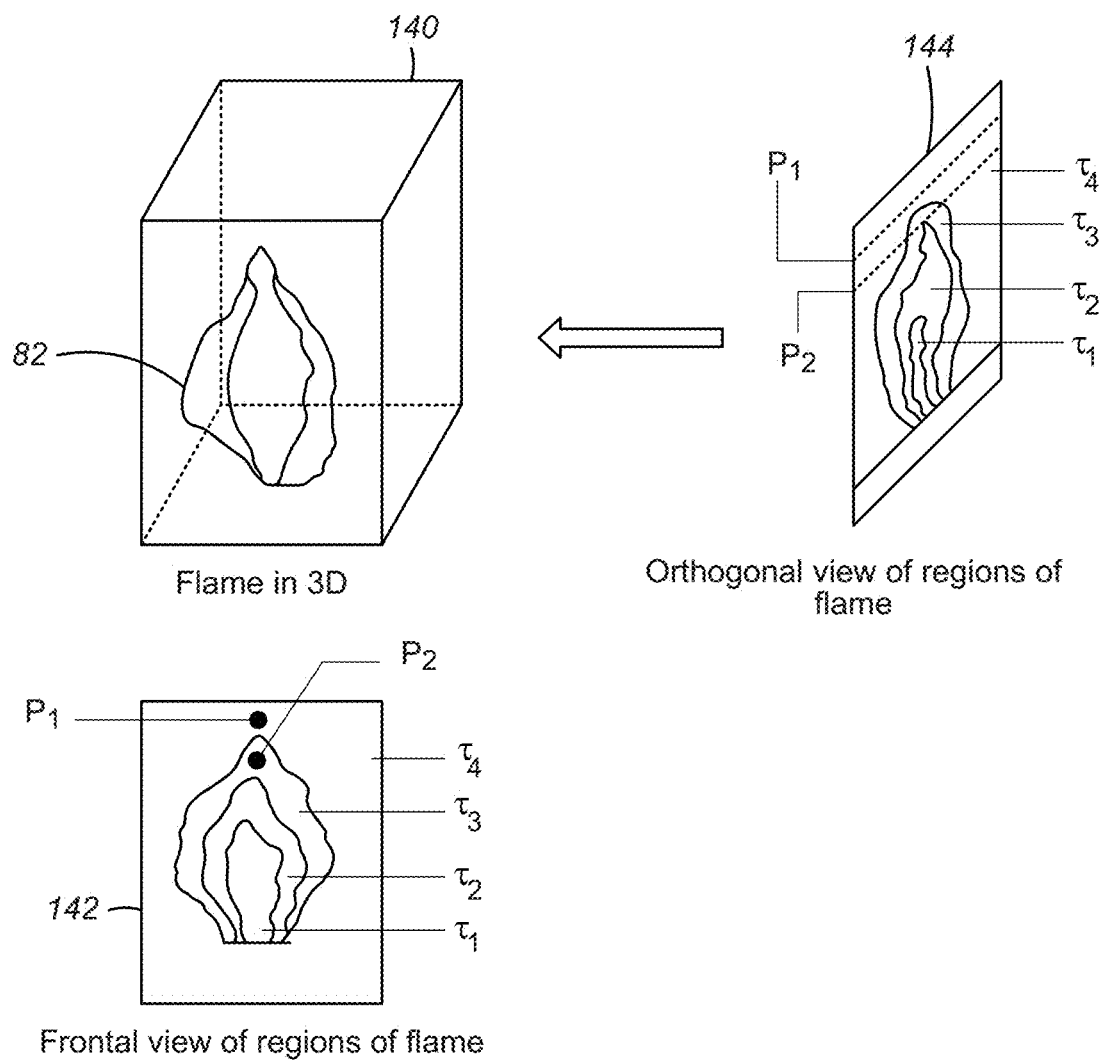
FIG. 15 shows a three-dimensional flame with a rectangular prism virtual bounding volume, with orthogonal view and frontal views of regions of the flame for estimating smoke and gas species concentrations.

The region outside the flame region and within the virtual bounding volume is shown as $r_4$ in FIG. 15. In region $r_4$, where no chemical reaction occurs, the observation path intersects only a single region (which is assumed in an example method to be homogenous). The depth L of the observation path through region $r_4$ is calculated as the distance between the outer boundary of the flame captured in band $\lambda_p$ to the bounding box. Thus, for every pixel (or a region of the image $Im1_i$, which has a uniform intensity), a system of linear equations across multiple bands can be written as below:

$$\begin{bmatrix} R_{tot}^{r(k)}(\lambda_1) \\ R_{tot}^{r(k)}(\lambda_2) \\ \vdots \\ R_{tot}^{r(k)}(\lambda_p) \end{bmatrix} = \begin{bmatrix} B(T_g,\lambda_1) \cdot L_g^{r(k)}(\lambda_1) \cdot [\alpha_{g(1)}(\lambda_1) \ldots \alpha_{g(n)}(\lambda_1)] \\ B(T_g,\lambda_2) \cdot L_g^{r(k)}(\lambda_2) \cdot [\alpha_{g(1)}(\lambda_2) \ldots \alpha_{g(n)}(\lambda_2)] \\ \vdots \\ B(T_g,\lambda_p) \cdot L_g^{r(k)}(\lambda_p) \cdot [\alpha_{g(1)}(\lambda_p) \ldots \alpha_{g(n)}(\lambda_p)] \end{bmatrix} \cdot \begin{bmatrix} C_{g(1)}^{r(k)} \\ C_{g(2)}^{r(k)} \\ \vdots \\ C_{g(n)}^{r(k)} \end{bmatrix}$$

By solving the above system of equations, the unknown on RHS, $C_g$ of different gases, can be estimated.

Multiple pixels that belong to the same region, and thus same concentrations of the gas species, can be compiled together forming an over-deterministic set of linear equations, which can be solved using various numerical methods, such as least square or regularization methods.

Water is a major byproduct of the combustion process, and water has many strong emissions in many spectral frequency bands. Some conventional approaches for estimating gas concentration separately estimate a correction factor to reduce the impact of the radiance emitted by water. An example method provided herein considers water vapor as one of the gas species. Hence, the estimated concentrations of the other gas species are of their own and not having contribution from others.

The concentrations of gases in other regions, e.g., $r_k$, can be iteratively estimated. For example, considering an observation in FIG. 15 at point $p_2$, along a path of the flame, which consists of only two regions $r_3$ and $r_4$. The total radiance emitted is the sum of radiances from regions $r_3$ and $r_4$ as shown in the equations below:

$$R_{tot} = R_3 + R_4, \text{ or}$$

$$R_3 = R_{tot} - R_4$$

Figure 16:
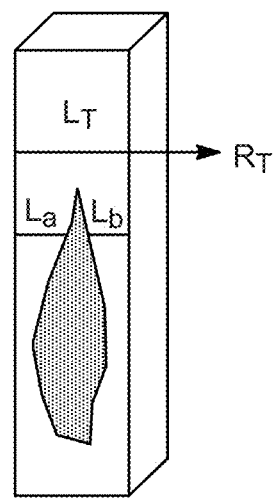
FIG. 16 shows particular regions of a flame for estimating a concentration of gases in different regions.

$R_{tot}$ is computed from the emitted radiation estimation process as disclosed herein. $R_4$ can be estimated as a fraction of the total radiance along a path where only $r_4$ is observed, as shown in FIGS. 15 and 16, i.e.:

$$R_4 = R_T(L_a + L_b)/L_T.$$

Once $R_3$ is computed, a system of linear equations can be established as disclose herein to estimate the concentration of gas species in region $r_3$. Concentrations of gas species in other inner regions, $r_i$, can be iteratively estimated.

Given the different concentration of gas species of interest, the processing unit can compute emissions metrics. Such emissions metrics can be combined into a global number, or as an image displaying with measures. One example flare metric is Destruction Removal Efficiency (DRE). Given the amount of hydrocarbon, $C_{HC\_in}$, from the fuel content measurement, for instance as measured by the gas composition meter 21 and the flow rate meter 22, DRE can be computed 152 from the estimated concentration of the hydrocarbon in the rectangular prism.

Figure 17:
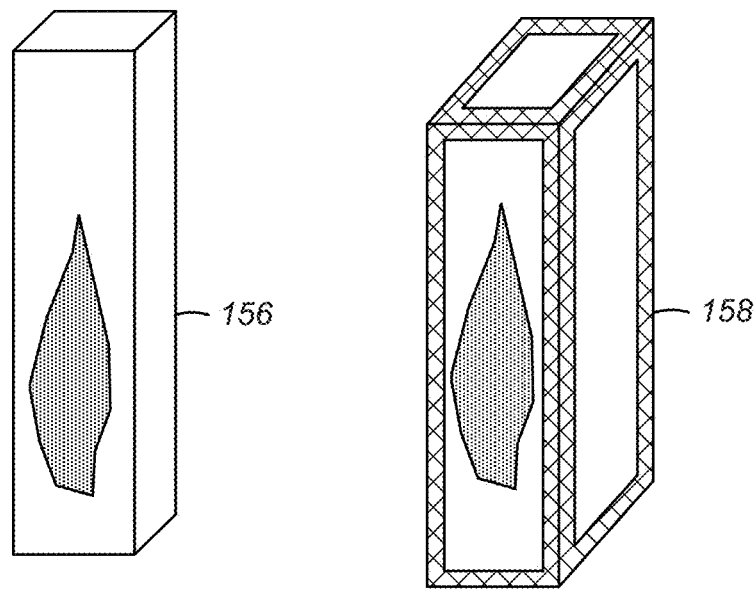
FIG. 17 shows a region of interest for estimating destruction removal efficiency (DRE)

Referring now to FIG. 17, an instantaneous DRE can be computed based on one set of multi-view, multispectral images. An example equation for calculating DRE is disclosed herein. The DRE over a period of time, e.g., 15, 30, 45 seconds, or any other period of time, can be computed from summation of the instantaneous DREs within the specified time period. Alternatively, the DRE over a period of time can be computed from the instantaneous DRE multiplied by the length of time, assuming that the flame combustion reaches a stable state.

The operator can specify the region of interest where the DRE is computed, e.g., a rectangular prism 156 excluding the flame regions or the peripheral boundaries of a bound box 158, as shown by example in FIG. 17. The DRE can be expressed as a set of values indicating the DRE at points within the region of interest or as a global value, which can be the mean or median of the DRE within the regions of interest, plus a confidence measure if desired, such as but not limited to the standard deviation.

Another example flare combustion metric is combustion efficiency (CE), which can be computed from the concentrations of the hydrocarbon, carbon dioxide, and carbon monoxide using the example CE equation set out herein. Many other example flare combustion metrics can be computed from the concentrations of the gas species, as will be appreciated.

The processing unit 100 can also estimate a smoke characterization 150 from the flare 84. Typically, smoke characterization in the art is determined by the Ringelmann scale. In an example method provided herein, an automated process is provided to match Ringelmann measures to invisible images, or at night/low light conditions. Solutions can be formulated using correlation between a visible image and a multi-spectral image from a thermal domain to establish a relationship, such as a look-up table or function. Then, at night or low-light conditions, the established relationship and input from a multi-spectral image can be used to estimate a smoke characterization.

The Ringelmann Smoke Chart (e.g., as can be found at www.cdc.gov/niosh) fulfills a significant need in smoke abatement work and in certain problems in the combustion of fuels. The Ringelmann system is virtually a scheme in which graduated shades of gray, varying by five equal steps between while and black, may be accurately reproduced using a rectangular grill of black lines of definite width and spacing on a white background.

While the Ringelmann Smoke Chart still serves a useful purpose, the data obtained by its use is empirical in nature and has definite limitations. For example, the apparent darkness or opacity of a stack plume depends upon the concentration of the particulate matter in the effluent, the size of the particulate, the depth of the smoke column being viewed, natural lighting conditions such as the direction of the sun relative to the observer, and the color of the particles. Since unburned carbon is a principal coloring material in a smoke column from a furnace using coal or oil, the relative shade is a function of the combustion efficiency.

To use the chart, the chart typically is supported on a level with the observer's eye, at such a distance from the observer that the lines on the chart merge into shades of gray, and as nearly as possible in line with the stack. The observer glances from the smoke, as it issues from the stack, to the chart and notes the number of the chart most nearly corresponding with the shade of the smoke, then records this number with the time of observation. To determine average smoke emission over a relatively long period of time, such as an hour, observations are usually repeated at one-fourth or one-half minute intervals. The readings are then reduced to the total equivalent of No. 1 smoke as a standard (All white). No. 1 smoke being considered as 20 percent dense, the percentage "density" of the smoke for the entire period of observation is obtained by the formula:

$$\frac{\text{Equivalent units of No. 1 smoke} \times 0.20 \times 100}{\text{Number of observations}} =$$

percentage smoke density.

To address issues with the conventional Ringelmann scale, the processing unit 100 in an example method provides a video-based Ringelmann scale in which a set of computer algorithms characterize the smoke from the flare 84 using images captured in the visible and other spectral bands. Weather information and data from gas species estimation results as disclosed herein, preferably are also utilized.

shown in the example table below. The mapping function is derived using the features extracted from the visible camera smoke region (A), thermal camera smoke region (B), and non-smoke regions from multiple spectrums (C) and the atmospheric conditions (atm) such as outdoor temperature, visibility, humidity, rain, etc. The mapping derives the Video-Ringelmann scale, which preferably has a one-to-one correspondence to the original Ringelmann scale (No. 1 to No. 4).

TABLE I

| Ringelmann Scale | Video Ringelmann Scale | Mapping Function | Visible Smoke Features (A) | Thermal Smoke Features (B) | Non Smoke Region Features (C) |
|---|---|---|---|---|---|
| No. 0 | 17 | F (A, B, C) | $(\alpha, \sigma, \mu, \varepsilon, \ldots)$ | $(\alpha', \sigma', \mu', \varepsilon', \ldots)$ | $(\alpha'', \sigma'', \mu'', \varepsilon'', \ldots)$ |
| No. 1 | 14-16 | | $(\alpha, \sigma, \mu, \varepsilon, \ldots)$ | $(\alpha', \sigma', \mu', \varepsilon', \ldots)$ | $(\alpha'', \sigma'', \mu'', \varepsilon'', \ldots)$ |
| No. 2 | 9-13 | | $(\alpha, \sigma, \mu, \varepsilon, \ldots)$ | $(\alpha', \sigma', \mu', \varepsilon', \ldots)$ | $(\alpha'', \sigma'', \mu'', \varepsilon'', \ldots)$ |
| No. 3 | 4-8 | | $(\alpha, \sigma, \mu, \varepsilon, \ldots)$ | $(\alpha', \sigma', \mu', \varepsilon', \ldots)$ | $(\alpha'', \sigma'', \mu'', \varepsilon'', \ldots)$ |
| No. 4 | 2-3 | | $(\alpha, \sigma, \mu, \varepsilon, \ldots)$ | $(\alpha', \sigma', \mu', \varepsilon', \ldots)$ | $(\alpha'', \sigma'', \mu'', \varepsilon'', \ldots)$ |
| No. 5 | 1 | | $(\alpha, \sigma, \mu, \varepsilon, \ldots)$ | $(\alpha', \sigma', \mu', \varepsilon', \ldots)$ | $(\alpha'', \sigma'', \mu'', \varepsilon'', \ldots)$ |

Figure 18:
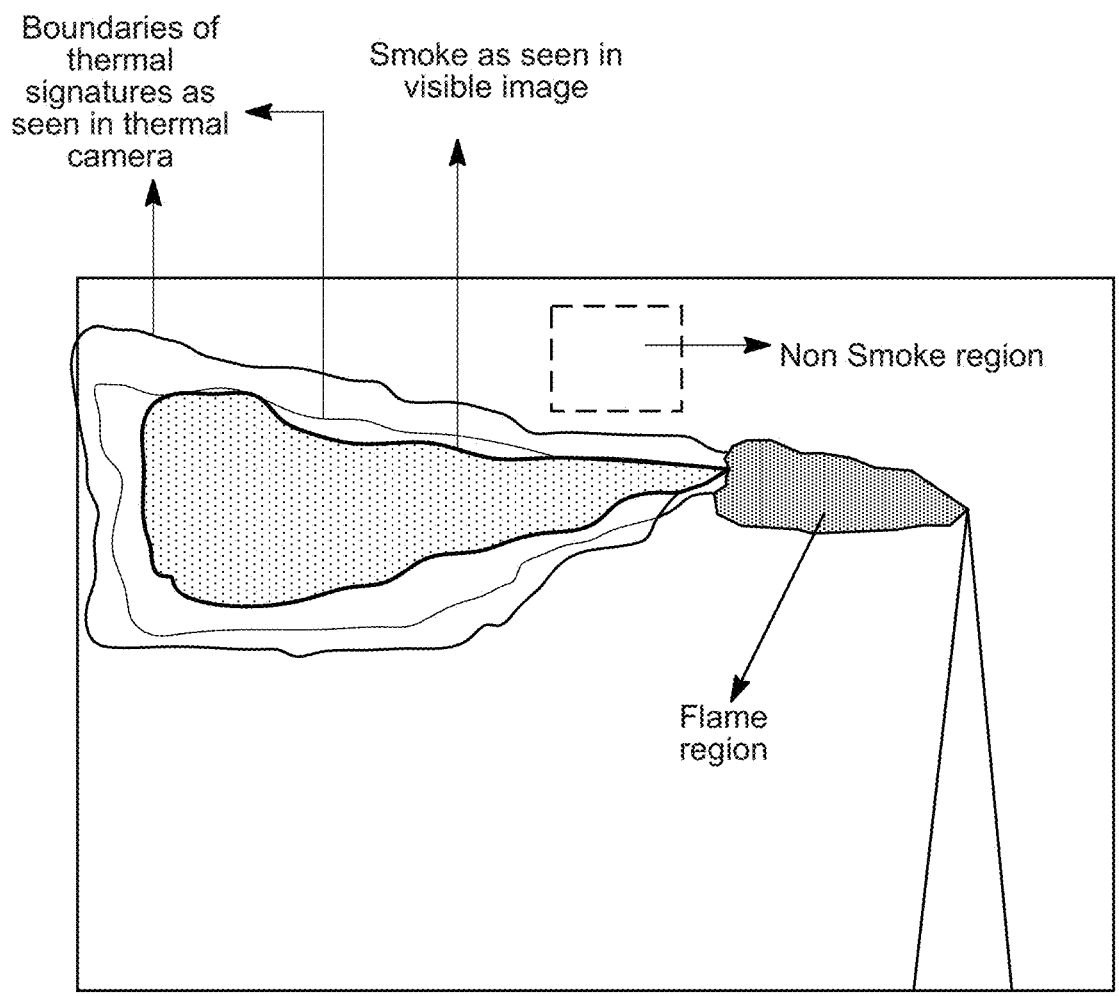
FIG. 18 shows an example fused image of a flare provided by registering and overlaying images from a visible (color) and multispectral camera, showing information from color and thermal spectrums.

The visible color 94 and multispectral cameras 92 in respective multispectral imaging subsystems 90a, 90b, 90c are registered to one another (step 122), as disclosed herein. The registered images from the color and multispectral cameras 94, 92 are overlaid, and the region corresponding to the smoke is considered for analysis. FIG. 18 shows a representative image depicting the fused image containing information from color and thermal spectrums.

Using conventional techniques as disclosed in U.S. Pat. No. 7,876,229, which is incorporated by reference herein in its entirety, the boundaries of the smoke are obtained in the visible image. The dotted region in the fused image corresponds to the smoke as seen in the visible region, and the two contours surrounding the dotted region correspond to the boundaries of the thermal signatures of the smoke (hot smoke), as captured from the thermal camera. These boundaries are derived using multiple threshold values applied on a single spectral band (e.g., 10-10.5 micron long wavelength infrared (LWIR)) or derived from multiple bands of thermal camera data.

Multiple image-based features including average grayscale, standard deviation, gray level co-occurrence matrix (GLCM), energy, contrast, entropy, correlation, homogeneity, brightness, and texture data may be extracted from the smoke region. Other features that may be extracted include texture analysis methods such as local binary patterns (LBP) and run-length encoding (RLE). Similar features can also be extracted from the registered thermal data in the regions corresponding to the visible smoke and the non-visible hot smoke regions.

Additionally, a reference, non-smoke region (as shown by the dotted box in FIG. 18) is recorded in the camera data, and the same image-based features are computed on it. Under unfavorable conditions, it is fair to assume that the reference region would be degraded similarly to the smoke region. The features in the smoke region are normalized using the reference features to remove the effect of these conditions.

Figure 19:
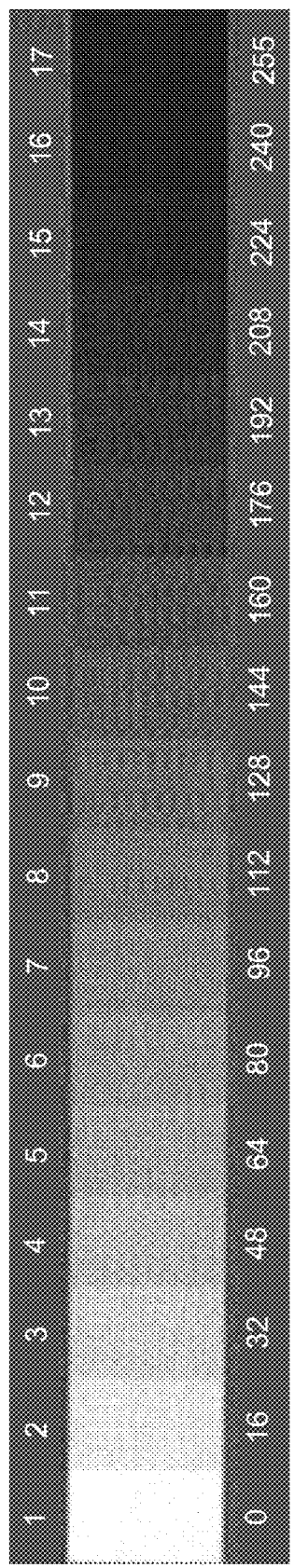
FIG. 19 shows a simplified Video-Ringelmann scale based on video gray value.

As a non-limiting example, the average gray level of the smoke is compared to the standard grayscale chart to obtain a Video-Ringelmann scale number (1-17) as indicated in FIG. 19, which is a simplified scale based only on video gray value.

A mapping function is provided for mapping between the actual Ringelmann scale and the Video-Ringelmann scale as As the example multispectral imaging subsystem is able to capture data in multiple narrow bands of the spectrum, the thermal smoke features can be derived for each band ($B_1$, $B_2$, ..., $B_n$). A single mapping function based on features from all bands or multiple mapping functions, one for each band, can be derived to obtain the Video Ringelmann scale.

Unfavorable conditions such as low light, rain, smog, and complete darkness pose significant challenges. For instance, a visible image cannot always differentiate between smoke and non-smoke regions at night. However, a thermal camera will still be able to capture the contour of the heated smoke regions. The features extracted from the multispectral bands, ($B_1, B_2, \ldots, B_n$), are not affected by the presence or absence of visible light.

A machine learning algorithm, such as but not limited to support vector machine (SVM), adaptive boosting (AdaBoost), and others, can be used to map the feature behavior of the visible and the multi-spectral bands under favorable conditions. As disclosed herein, in favorable conditions, given the smoke region features in the visible image, the video-Ringelmann scale can be derived. Then, under less favorable conditions, where visible features may be missing, the learned features from the multi-spectral bands (using the mapping function from the machine learning algorithm) can be used to estimate the video-Ringelmann scale. Additional information that can be used to improve the mapping of features in multi-spectral thermal bands to the video-Ringelmann scale include the size of the visible flame 82 and its color characteristics, and the flame composition (CE) data, if available.

Thus, an example system 80 can output multiple views of flare 84 images as captured by multiple spectral images. Each image includes the principal image and multiple spectral images that the operator desires. The set of images can be used to provide a virtual bounding volume having virtual surfaces, which indicate an amount of emission measured for each of the pixels or points of the images. This can be used to derive emissions estimates such as gas species concentration, smoke quantity, DRE, CE, etc.

Results can be displayed as images, e.g., on a vertical plane, sent to an operator as report or status of emission of a flare (e.g., values of global measures of DRE, CE, gas concentration, etc.). In some example embodiments, the resulting images can be combined to provide a composite image to visualize the flare or flame, using methods such as those disclosed in commonly-owned U.S. Pat. No. 9,127,891, which is incorporated in its entirety by reference herein. The results can be used to trigger an alarm if the results exceed set thresholds.

Specific Embodiments

While the following is described in conjunction with specific embodiments, it will be understood that this description is intended to illustrate and not limit the scope of the preceding description and the appended claims.

A first embodiment of the invention is a process for estimating a three-dimensional (3D) radiance field of a combustion process in an open combustion environment, comprising receiving a captured image from each of a plurality of image capturing devices in at least one selected spectral band, wherein each of the plurality of image capturing devices is trained on a flame from the combustion process from a different perspective view angle; for each of the received images, transforming the intensities of the respective image to received radiances, to provide a plurality of radiance images; and estimating, using a computer processor, the 3D radiance field within a virtual bounding volume surrounding the flame based on a two-dimensional (2D)-to-3D transforming of the radiance images. An embodiment of the invention is one, any or all of prior embodiments in this paragraph up through the first embodiment in this paragraph, wherein the image capturing device comprise multi-spectral image-capturing devices; wherein the process further comprises, for each of a selected one or more of the plurality of spectral bands, capturing the images of the flame from each of the plurality of multi-spectral image-capturing devices; wherein the receiving a captured image comprises, for each of the selected one or more of the plurality of spectral bands, receiving the captured image from each of the plurality of multi-spectral image-capturing devices; and wherein the estimating the 3D radiance field comprises estimating the 3D radiance fields of each of the selected one or more of the plurality of spectral bands within the virtual bounding volume. An embodiment of the invention is one, any or all of prior embodiments in this paragraph up through the first embodiment in this paragraph, further comprising performing an intensity-temperature calibration based an association between an intensity of an image pixel and an actual temperature associated with the combustion process; wherein the transforming is based on the performed intensity-temperature calibration. An embodiment of the invention is one, any or all of prior embodiments in this paragraph up through the first embodiment in this paragraph, further comprising performing a registration and alignment estimation of the received images based on positional information of the plurality of image-capturing devices and positional information of the flame in the open combustion environment; and aligning the plurality of radiance images based on the registration estimation; wherein the two-dimensional (2D)-to-3D transforming is of the aligned radiance images. An embodiment of the invention is one, any or all of prior embodiments in this paragraph up through the first embodiment in this paragraph, further comprising performing an intensity-temperature calibration based an association between an intensity of an image pixel and an actual temperature associated with the combustion process, wherein the transforming is based on the performed intensity-temperature calibration; and performing a perspective transformation on the aligned plurality of radiance images to correct for relative motion of the image-capturing devices. An embodiment of the invention is one, any or all of prior embodiments in this paragraph up through the first embodiment in this paragraph, wherein at least one of the image-capturing devices is transiently positioned with respect to the flame; wherein the method further comprises determining a position of the at least one image-capturing device at a time when the image from that image-captured device is captured.

A second embodiment of the invention is a process for measuring emission for a flame in an open combustion environment, comprising receiving a captured image from each of a plurality of image capturing devices in at least one selected spectral band, wherein each of the plurality of image capturing devices is trained on the flame from the combustion process from a different perspective view angle; estimating a spectral path length of the flame in the at least one spectral band from the captured images; estimating emitted radiance of the flame from the captured images; estimating a temperature of the flame from the estimated emitted radiance; estimating a gas species concentration of the flame from the estimated temperature of the flame and the estimated spectral path length of the flame; and measuring emission for the flame from the estimated gas species concentration. An embodiment of the invention is one, any or all of prior embodiments in this paragraph up through the second embodiment in this paragraph, wherein the image capturing devices comprise multi-spectral image-capturing devices; wherein the selected one or more of the plurality of spectral bands comprises a plurality of selected spectral bands, and wherein the receiving a captured image comprises receiving a captured image from each of a plurality of image capturing devices in each of the plurality of selected spectral bands; and wherein the estimating a spectral path length of the flame comprises estimating a spectral path length in each of the plurality of selected spectral bands. An embodiment of the invention is one, any or all of prior embodiments in this paragraph up through the second embodiment in this paragraph, further comprising for each of a plurality of pixels in each of the received images, transforming a sensed image intensity from the image-capturing device to a received radiance; and transforming the received radiance to an estimated emitted radiance by adjusting the received radiance for atmospheric attenuation. An embodiment of the invention is one, any or all of prior embodiments in this paragraph up through the second embodiment in this paragraph, further comprising calibrating the plurality of image-capturing devices; registering the plurality of image-capturing devices; and synchronizing the plurality of image-capturing devices. An embodiment of the invention is one, any or all of prior embodiments in this paragraph up through the second embodiment in this paragraph, further comprising receiving a plurality of captured visible spectrum images captured from a plurality of visible color cameras respectively registered with each of the image-capturing devices; and characterizing smoke from the open combustion environment from the received captured images and the received captured visible images. An embodiment of the invention is one, any or all of prior embodiments in this paragraph up through the second embodiment in this paragraph, further comprising overlaying the received captured image from at least one of the image-capturing devices with the received captured visible spectrum image from the visible color camera registered with that one of the image-capturing devices to provide a fused image; determining at least one thermal signature boundary and a visible smoke boundary in the fused image, wherein the at least one thermal signature boundary is determined based on the received captured image from the at least one of the plurality of image-capturing devices, and the visible smoke boundary is determined based on the respective captured visible spectrum image; determining a reference region in the fused image; and mapping a Ringelmann scale associated with the visible smoke boundary to a normalized Ringelmann scale based on the at least one thermal signature boundary, the visible smoke boundary, the reference region, and at least one environmental condition. An embodiment of the invention is one, any or all of prior embodiments in this paragraph up through the second embodiment in this paragraph, wherein the measuring emission comprises smoke quantification. An embodiment of the invention is one, any or all of prior embodiments in this paragraph up through the second embodiment in this paragraph, wherein the estimating a gas species concentration comprises estimating a gas species concentration for at least two gas species; wherein one of the gas species comprises water vapor. An embodiment of the invention is one, any or all of prior embodiments in this paragraph up through the second embodiment in this paragraph, wherein the flame is emitted from a flare fed by a hydrocarbon feed line, wherein the process further comprises measuring a mass flow rate and a gas composition in the hydrocarbon feed line; wherein the measuring emission is further based on the measured mass flow rate and gas composition. An embodiment of the invention is one, any or all of prior embodiments in this paragraph up through the second embodiment in this paragraph, wherein the flame is emitted from a flare fed by a hydrocarbon feed line; and wherein the estimating a gas species concentration comprises estimating a gas species concentration for at least one gas species; and wherein the measuring emission comprises measuring destruction removal efficiency (DRE) of the flare based on the estimated gas species concentration for the at least two gas species, a measured mass flow rate in the hydrocarbon feed line, and a measured gas composition in the hydrocarbon feed line. An embodiment of the invention is one, any or all of prior embodiments in this paragraph up through the second embodiment in this paragraph, wherein the flame is emitted from a flare fed by a hydrocarbon feed line; wherein the estimating a gas species concentration comprises estimating a gas species concentration for at least two gas species; and wherein the measuring emission comprises measuring combustion efficiency (CE) of the flare based on the estimated gas species concentration for the at least two gas species. An embodiment of the invention is one, any or all of prior embodiments in this paragraph up through the second embodiment in this paragraph, wherein the estimating a spectral path length comprises estimating regional boundaries of the flame in each of the captured images within a virtual bounding volume based on thresholding techniques; for a captured image received from one of the image-capturing cameras, estimating a spectral path length for each pixel within the estimated regional boundaries of the flame based on a width of the estimated regional boundaries of the flame for a captured image from another of the image-capturing devices; and for the captured image received from the one of the multispectral cameras, estimating a path length of each pixel outside of the estimated regional boundaries of the flame based on a width of the virtual bounding volume. An embodiment of the invention is one, any or all of prior embodiments in this paragraph up through the second embodiment in this paragraph, wherein at least one of the image-capturing devices is transiently positioned with respect to the flame; wherein the method further comprises determining a position of the at least one image-capturing device at a time when the image from that image-captured device is captured.

A third embodiment of the invention is an apparatus for measuring emission for a flame in an open combustion environment, comprising a plurality of image capturing devices for capturing images in at least one selected spectral band, wherein each of the plurality of image capturing devices is trained on the flame from the combustion process from a different respective view angle; a processor in communication with the plurality of image capturing devices, the processor being configured to: receive a captured image from each of the plurality of image capturing devices; estimate a spectral path length of the flame in the at least one spectral band from the captured images; estimate an emitted radiance of the flame from the captured images; estimate a temperature of the flame from the estimated emitted radiance; estimate a gas species concentration of the flame from the estimated temperature of the flame and the estimated spectral path length of the flame; and measure emission for the flame from the estimated gas species concentration.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While particular embodiments of the present estimation process have been described herein, it will be appreciated by those skilled in the art that changes and modifications may be made thereto without departing from the invention in its broader aspects and as set forth in the following claims.

What is claimed is:

1. A process for calculating gas emission for a flame of a combustion process in an open combustion environment, comprising:
   receiving a captured image from each of a plurality of image capturing devices in at least one selected spectral band, wherein each of the plurality of image capturing devices is trained on the flame from the combustion process from a different perspective view angle, wherein the combustion process comprises a flare or a field of flares;
   calibrating the plurality of image-capturing devices;
   registering the plurality of image-capturing devices;
   synchronizing the plurality of image-capturing devices;
   estimating a spectral path length of the flame in the at least one spectral band from the captured images;
   estimating emitted radiance of the flame from the captured images;
   estimating a temperature of the flame from the estimated emitted radiance;
   estimating a gas species concentration of the flame from the estimated temperature of the flame and the estimated spectral path length of the flame; and
   calculating gas emission for the flame from the estimated gas species concentration.

2. The process of claim 1, wherein the image capturing devices comprise multi-spectral image-capturing devices;
wherein the selected one or more of the plurality of spectral bands comprises a plurality of selected spectral bands, and wherein said receiving a captured image comprises receiving a captured image from each of a plurality of image capturing devices in each of the plurality of selected spectral bands; and
wherein said estimating a spectral path length of the flame comprises estimating a spectral path length in each of the plurality of selected spectral bands.

3. The process of claim 2, further comprising:
for each of a plurality of pixels in each of the received images, transforming a sensed image intensity from the image-capturing device to a received radiance; and
transforming the received radiance to an estimated emitted radiance by adjusting the received radiance for atmospheric attenuation.

4. The process of claim 1, further comprising:
receiving a plurality of captured visible spectrum images captured from a plurality of visible color cameras respectively registered with each of the image-capturing devices;
characterizing smoke from the open combustion environment from the received captured images and the received captured visible images.

5. The process according to claim 4, further comprising:
overlaying the received captured image from at least one of the image-capturing devices with the received captured visible spectrum image from the visible color camera registered with that one of the image-capturing devices to provide a fused image;
determining at least one thermal signature boundary and a visible smoke boundary in the fused image, wherein the at least one thermal signature boundary is determined based on the received captured image from the at least one of the plurality of image-capturing devices, and the visible smoke boundary is determined based on the respective captured visible spectrum image;
determining a reference region in the fused image;
mapping a Ringelmann scale associated with the visible smoke boundary to a normalized Ringelmann scale based on the at least one thermal signature boundary, the visible smoke boundary, the reference region, and at least one environmental condition.

6. The process of claim 4, wherein said calculating gas emission comprises smoke quantification.

7. The process according to claim 1, wherein said estimating a gas species concentration comprises estimating a gas species concentration for at least two gas species;
wherein one of the gas species comprises water vapor.

8. The process of claim 1, wherein the flame is emitted from a burner of the flare, wherein the flare is fed by a hydrocarbon feed line,
wherein the process further comprises measuring a mass flow rate and a gas composition in the hydrocarbon feed line;
wherein said calculating gas emission is further based on the measured mass flow rate and gas composition.

9. The process of claim 1, wherein the flame is emitted from the flare, wherein the flare is fed by a hydrocarbon feed line; and
wherein said estimating a gas species concentration comprises estimating a gas species concentration for at least one gas species; and
wherein said calculating gas emission comprises calculating destruction removal efficiency (DRE) of the flare based on the estimated gas species concentration for the at least two gas species, a measured mass flow rate in the hydrocarbon feed line, and a measured gas composition in the hydrocarbon feed line.

10. The process of claim 1, wherein the flame is emitted from the flare, wherein the flare is fed by a hydrocarbon feed line;
wherein said estimating a gas species concentration comprises estimating a gas species concentration for at least two gas species; and
wherein said calculating gas emission comprises calculating combustion efficiency (CE) of the flare based on the estimated gas species concentration for the at least two gas species.

11. The process of claim 1, wherein said estimating a spectral path length comprises:
estimating regional boundaries of the flame in each of the captured images within a virtual bounding volume based on thresholding techniques;
for a captured image received from one of the image-capturing cameras, estimating a spectral path length for each pixel within the estimated regional boundaries of the flame based on a width of the estimated regional boundaries of the flame for a captured image from another of the image-capturing devices; and
for the captured image received from the one of the multispectral cameras, estimating a path length of each pixel outside of the estimated regional boundaries of the flame based on a width of the virtual bounding volume.

12. The process of claim 1, wherein at least one of the image-capturing devices is transiently positioned with respect to the flame;
wherein the method further comprises determining a position of the at least one image-capturing device at a time when the image from that image-captured device is captured.

13. A process for calculating gas emission for a flame of a combustion process in an open combustion environment, comprising:
receiving a captured image from each of a plurality of image capturing devices in at least one selected spectral band, wherein each of the plurality of image capturing devices is trained on the flame from the combustion process from a different perspective view angle, wherein the combustion process comprises a flare or a field of flares, wherein the flame is emitted from a burner of the flare, wherein the flare is fed by a hydrocarbon feed line;
estimating a spectral path length of the flame in the at least one spectral band from the captured images;
estimating emitted radiance of the flame from the captured images;
estimating a temperature of the flame from the estimated emitted radiance;
estimating a gas species concentration of the flame from the estimated temperature of the flame and the estimated spectral path length of the flame;
measuring a mass flow rate and a gas composition in the hydrocarbon feed line; and
calculating gas emission for the flame from the estimated gas species concentration and based on the measured mass flow rate and gas composition.

14. A process for calculating gas emission for a flame of a combustion process in an open combustion environment, comprising:

receiving a captured image from each of a plurality of image capturing devices in at least one selected spectral band, wherein each of the plurality of image capturing devices is trained on the flame from the combustion process from a different perspective view angle, wherein the combustion process comprises a flare or a field of flares;

estimating a spectral path length of the flame in the at least one spectral band from the captured images;

estimating emitted radiance of the flame from the captured images;

estimating a temperature of the flame from the estimated emitted radiance;

estimating a gas species concentration of the flame from the estimated temperature of the flame and the estimated spectral path length of the flame; and calculating gas emission for the flame from the estimated gas species concentration, and, wherein said estimating a spectral path length comprises:

estimating regional boundaries of the flame in each of the captured images within a virtual bounding volume based on thresholding techniques;

for a captured image received from one of the image-capturing cameras, estimating a spectral path length for each pixel within the estimated regional boundaries of the flame based on a width of the estimated regional boundaries of the flame for a captured image from another of the image-capturing devices; and for the captured image received from the one of the multispectral cameras, estimating a path length of each pixel outside of the estimated regional boundaries of the flame based on a width of the virtual bounding volume.

* * * * *